(12) United States Patent
Wang et al.

(10) Patent No.: US 12,471,839 B2
(45) Date of Patent: Nov. 18, 2025

(54) LOW BACK PAIN ANALYSIS DEVICE, LOW BACK PAIN ANALYSIS METHOD, AND PROGRAM

(71) Applicant: TOHOKU UNIVERSITY, Sendai (JP)

(72) Inventors: Ziheng Wang, Sendai (JP); Keizo Sato, Sendai (JP); Ryoichi Nagatomi, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 977 days.

(21) Appl. No.: 17/648,289

(22) Filed: Jan. 18, 2022

(65) Prior Publication Data

US 2022/0249019 A1  Aug. 11, 2022

(30) Foreign Application Priority Data

Feb. 5, 2021  (JP) ................ 2021-017422

(51) Int. Cl.
*A61B 5/11* (2006.01)
*A61B 5/00* (2006.01)
*G16H 50/20* (2018.01)
*G16H 50/70* (2018.01)

(52) U.S. Cl.
CPC .......... *A61B 5/4824* (2013.01); *A61B 5/1118* (2013.01); *A61B 5/6891* (2013.01); *A61B 5/7264* (2013.01); *A61B 5/7275* (2013.01); *G16H 50/20* (2018.01); *G16H 50/70* (2018.01)

(58) Field of Classification Search
CPC ... A61B 5/4824; A61B 5/1118; A61B 5/6891; A61B 5/7264; A61B 5/7275
See application file for complete search history.

(56) References Cited

U.S. PATENT DOCUMENTS

| 9,795,322 B1 * | 10/2017 | Karunaratne | ........ A61B 5/6891 |
| 2017/0020438 A1 | 1/2017 | Wang | |
| 2017/0367655 A1 * | 12/2017 | Sugiyama | ............ A61B 5/6893 |

FOREIGN PATENT DOCUMENTS

| CN | 105877756 | 8/2016 |
| JP | 2001057996 | 3/2001 |
| JP | 2010082165 A | 4/2010 |

(Continued)

OTHER PUBLICATIONS

Hallac, David, "Toeplitz inverse covariance-based clustering of multivariate time series data", Proceedings of the 23rd ACM SIGKDD International Conference on Knowledge Discovery and Data Mining, (2017), pp. 215-223.

(Continued)

*Primary Examiner* — Eric F Winakur
(74) *Attorney, Agent, or Firm* — Schwegman Lundberg & Woessner, P.A.

(57) ABSTRACT

According to an aspect of the invention, there is provided a low back pain analysis device comprising: a processor; and a storage medium having computer program instructions stored thereon, wherein the computer program instructions, when executed by the processor, perform processing of: obtaining a relationship between a result of a pattern and a low back pain, using the result of the pattern obtained by classifying gravity center movement data acquired by a sensor, which is attached to furniture and acquires the gravity center movement data for a sitting period including a period for which a person is sitting on the furniture, using clustering.

10 Claims, 12 Drawing Sheets

(56) References Cited

FOREIGN PATENT DOCUMENTS

| JP | 2015021912 | 2/2015 |
|---|---|---|
| WO | 2020165854 | 8/2020 |

OTHER PUBLICATIONS

Jain, Saachi, "MASA: Motif-Aware State Assignment in Noisy Time Series Data", arXiv preprint arXiv:1809.01819, (2018), 11 pgs.

Specht, Donald F., "Probabilistic neural networks", Neural networks 3.1, (1990), pp. 109-118.

"Japanese Application Serial No. 2021-017422, Office Action dated May 28, 2024", w English Translation, (May 28, 2024), 5 pgs.

* cited by examiner

LOW BACK PAIN ANALYSIS DEVICE, LOW BACK PAIN ANALYSIS METHOD, AND PROGRAM

BACKGROUND OF THE INVENTION

Claim for Priority

This application claims the benefit of priority of Japanese Application No. 2021-017422, filed Feb. 5, 2021, which is incorporated by reference in its entirety.

FIELD OF THE INVENTION

The present invention relates to a low back pain analysis device, a low back pain analysis method, and a program.

DESCRIPTION OF RELATED ART

In modern society, there are many people who do desk work, and many people suffer from low back pain. Therefore, a technique that determines a posture and a device that issues a warning in a case in which the same posture continues for a long time on the basis of the determined posture have been proposed.

SUMMARY OF THE INVENTION

However, in practice, it is rare for a person who does desk work to sit in the same posture for a long time. Therefore, in many cases, it is difficult for the techniques proposed so far to prevent the occurrence of low back pain.

The invention has been made in view of the above-mentioned problems, and an object of the invention to provide a technique that estimates the probability that low back pain will occur with higher accuracy.

According to an aspect of the invention, there is provided a low back pain analysis device including an analysis unit that obtains a relationship between a result of a pattern and a low back pain, using the result of the pattern obtained by classifying gravity center movement data acquired by a sensor, which is attached to furniture and acquires the gravity center movement data for a sitting period including a period for which a person is sitting on the furniture, using clustering.

According to the invention, it is possible to estimate the probability that low back pain will occur with higher accuracy.

DETAILED DESCRIPTION OF THE INVENTION

Embodiment

Figure 1:
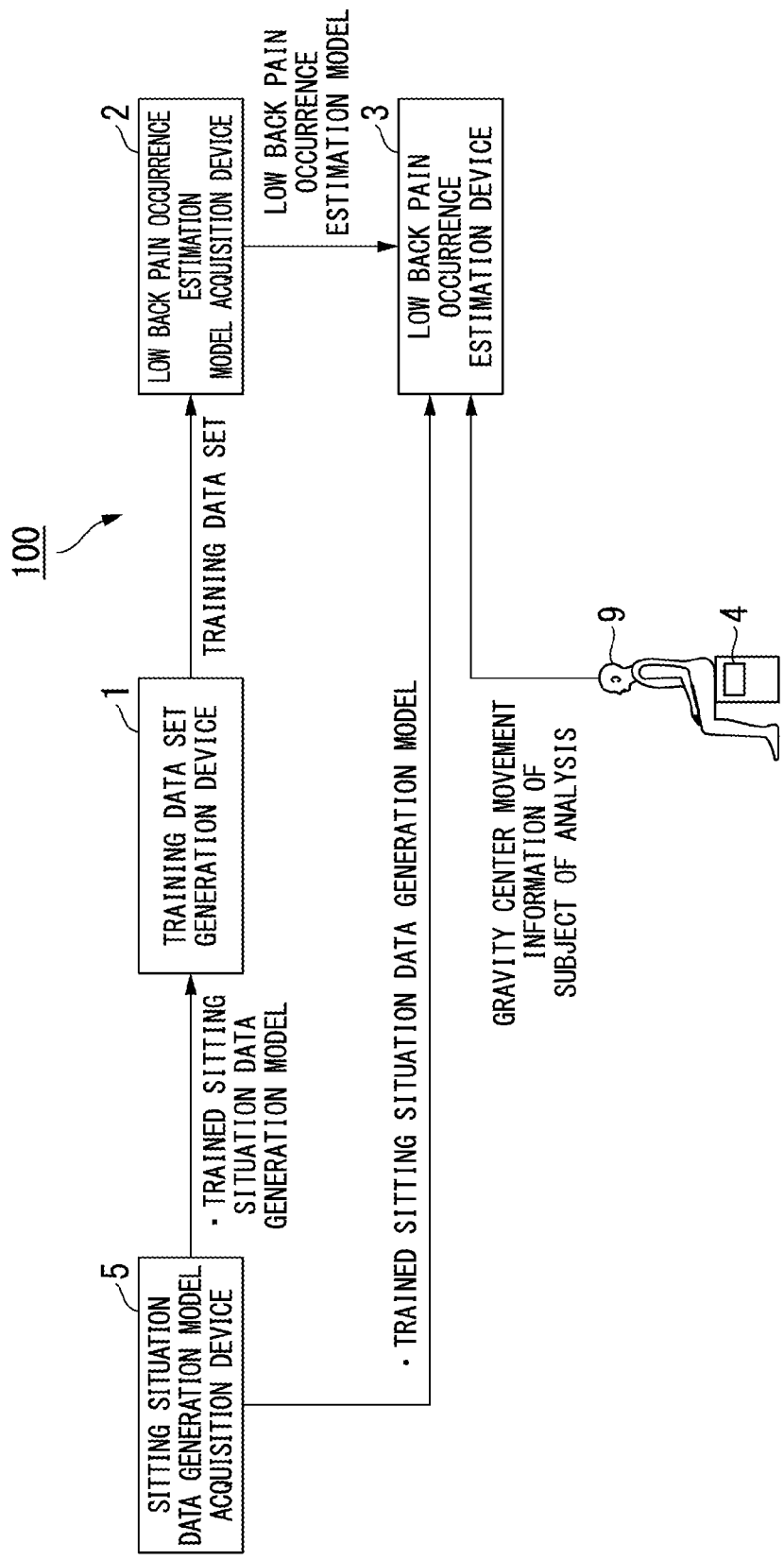
FIG. 1 is a diagram showing an outline of a low back pain occurrence estimation system 100 according to an embodiment.

FIG. 1 is a diagram showing an outline of a low back pain occurrence estimation system 100 according to an embodiment. The low back pain occurrence estimation system 100 updates a machine learning model (hereinafter, referred to as a "low back pain occurrence estimation learning model") for estimating the occurrence of low back pain using a machine learning method until a predetermined end condition (hereinafter, referred to as a "training end condition") is satisfied. The low back pain occurrence estimation system 100 estimates the probability that low back pain will occur in a person to be analyzed (hereinafter, referred to as a "subject of analysis 9"), using a trained low back pain occurrence probability learning model (hereinafter, referred to as a "low back pain occurrence estimation model"). In addition, the low back pain occurrence estimation system 100 acquires a mathematical model that generates data to be input to the low back pain occurrence estimation learning model, using an unsupervised machine learning method. Hereinafter, the mathematical model that is updated by training and generates the data to be input to the low back pain occurrence estimation learning model is referred to as a sitting situation data generation model.

In addition, the term "trained" means that the training end condition has been satisfied. For example, the training end condition is a condition that a model for machine learning (hereinafter, referred to as a "machine learning model") is updated a predetermined number of times. The training end condition may be, for example, a condition that a change in the machine learning model by update is smaller than a predetermined change.

In addition, the machine learning model is a set including one or a plurality of processes whose execution condition and order (hereinafter referred to as an "execution rule") are predetermined. Training means the update of the machine learning model by the machine learning method. Further, the update of the machine learning model means the suitable adjustment of the values of parameters in the machine learning model. Further, the execution of the machine learning model means that each process included in the machine learning model is executed according to the execution rule.

The low back pain occurrence estimation system 100 includes a training data set generation device 1, a low back pain occurrence estimation model acquisition device 2, a low back pain occurrence estimation device 3, a sensor 4, and a sitting situation data generation model acquisition device 5. The sensor 4 is a sensor that is attached to furniture and is used to acquire sitting situation data for a period (hereinafter, referred to as a "sitting period") including the period for which a person is sitting on the furniture.

The sitting situation data is information including the length of the sitting period and the number of times a predetermined gravity center movement common pattern appears for the sitting period. The gravity center movement common pattern is information obtained by a trained sitting situation data generation model on the basis of the data of the movement of the center of gravity in a sitting posture. Specifically, the gravity center movement common pattern is information indicating how the position of the center of gravity in the sitting posture changes over time (pattern).

The position of the center of gravity in the sitting posture is the position of the center of gravity of the person sitting on the furniture. The position of the center of gravity in the sitting posture is acquired by a sensor that can measure load such as a load sensor that is installed in the furniture. Therefore, the sensor 4 is a sensor that acquires a change in the position of the center of gravity in the sitting posture for the sitting period. Hereinafter, for simplicity of explanation, the low back pain occurrence estimation system 100 will be described using an exemplary example in which the position of the center of gravity in the sitting posture is measured by the load sensor installed in the furniture. The furniture is, for example, a chair. Hereinafter, for simplicity of explanation, the low back pain occurrence estimation system 100 will be described using a chair as an exemplary example of the furniture.

In the low back pain occurrence estimation system 100, for example, the measurement results of four load sensors in a state in which the four load sensors are installed on the back side of a sitting surface of the chair are used. The arrangement of the four load sensors will be described. The four load sensors are arranged in a square shape such that the coordinates of the position of the center of the sitting surface are (0,0) and the coordinates of the positions of the four load sensors are (1, 1), (1, −1), (−1, 1), and (−1, −1). In an aspect of the invention, loads A(1, 1), A(1, −1), A(−1, 1), and A(−1, −1) at the positions of the four load sensors are measured. The center of gravity is calculated by, for example, the following Expression (1).

$$\frac{A(1, 1) + A(1, -1) + A(-1, 1) + A(-1, -1)}{4}$$

In the low back pain occurrence estimation system 100, for example, it is preferable that data is acquired in a state in which the position of the center of gravity in the sitting posture is divided into the position of the center of gravity in the sitting posture in a forward-backward direction and the position of the center of gravity in the sitting posture in a left-right direction. The reason is that, in a case in which the low back pain occurrence estimation system 100 uses the measurement results of a plurality of load sensors, it is necessary to analyze a multidimensional amount when the analysis is performed using, for example, a random Markov process, which will be described below, and clustering is complicated. In addition, when the analysis is performed only in the forward-backward direction and the left-right direction, it is easy to understand behavior, for example, when the user stands up from the chair. As described above, when the position of the center of gravity is divided into the position of the center of gravity in the forward-backward direction and the position of the center of gravity in the left-right direction, the low back pain occurrence estimation system 100 can easily determine the analysis result.

In addition, any number of load sensors may be installed at any position as long as the position of the center of gravity in the sitting posture can be acquired. It does not matter how the sensors are arranged as long as the sitting situation of the user, who uses the chair, on the chair can be obtained.

The sensor 4 is not necessarily the load sensor. An acceleration sensor may be used as the sensor 4 instead of the load sensor. In a case in which the acceleration sensor is used, acceleration data is acquired instead of the displacement data of the center of gravity. Therefore, the gravity center movement common pattern is obtained by knowing whether or not the center of gravity has moved. Therefore, in a case in which the acceleration sensor is used instead of the load sensor, the low back pain occurrence estimation system 100 derives data related to the movement of the center of gravity, using an expression which has been derived in advance in consideration of the amount of, for example, acceleration data related to the acquisition of the movement of the center of gravity. In a case in which the acceleration sensor is used instead of the load sensor, the low back pain occurrence estimation system 100 performs the same analysis as that in a case in which the sensor used to acquire the movement of the center of gravity is the load sensor in this way.

The trained sitting situation data generation model is a mathematical model that converts gravity center movement information, which is the data of the movement of the center of gravity for the sitting period, into sitting situation data. Specifically, the gravity center movement information is information indicating a change in the position of the center of gravity in the sitting posture obtained by the sensor 4. More specifically, the gravity center movement information is a time series indicating a change in the position of the center of gravity in the sitting posture over time for the sitting period. Therefore, the gravity center movement information also includes information indicating the length of the sitting period.

Here, a process that is executed in the low back pain occurrence estimation system 100 and is executed when the sitting situation data generation model is trained and/or when the trained sitting situation data generation model is executed will be described.

Specifically, each of a unit time information generation process, a unit classification process, an appearance pattern acquisition process, a common pattern determination process, a common pattern appearance number acquisition process, a sitting situation data generation process, and a training data generation process will be described.

The unit time information generation process is a process that divides the time series indicated by the gravity center movement information for each unit time. Hereinafter, each of the time series divided by the unit time information generation process is referred to as unit time information. The unit time is a predetermined time. The unit time is, for example, 5 seconds. The unit time may be, for example, 10 seconds. The unit time does not need to be one type, and a plurality of types of unit time may be used.

For example, in a case in which there are two types of unit time of a first unit time and a second unit time, the unit time information generation process generates two types of results, that is, the result of dividing the gravity center movement information by the first unit time and the result of dividing the gravity center movement information by the second unit time. As described above, the unit time information is at least some of the time series indicated by the gravity center movement information and is a time series of unit time.

Figure 2:
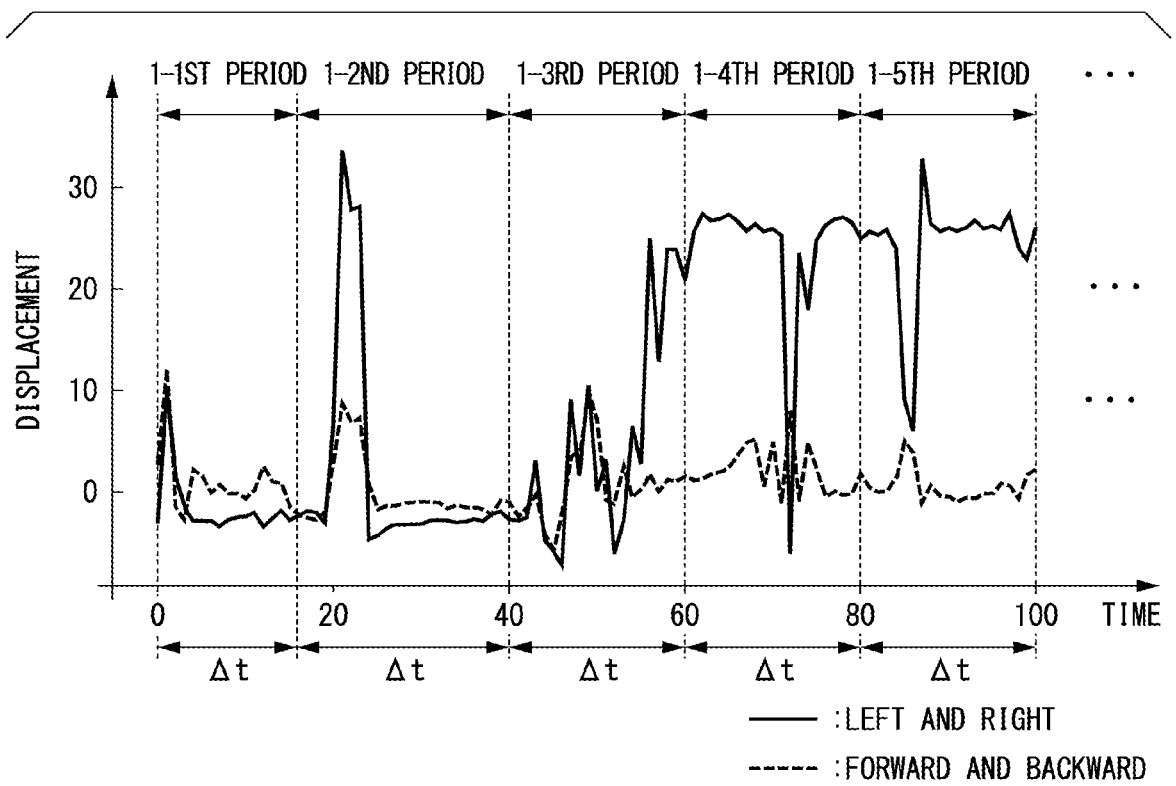
FIG. 2 is a diagram showing an example of unit time information in the embodiment.

FIG. 2 is a diagram showing an example of the unit time information in the embodiment. In FIG. 2, the horizontal axis indicates time. In FIG. 2, the vertical axis indicates the position of the center of gravity in the sitting posture (displacement from the position of the center of the sitting surface). "Left and right" means the measurement result of the position of the center of gravity in the sitting posture in the left-right direction of the chair. "Forward and backward" means the measurement result of the position of the center of gravity in the sitting posture in the forward-backward direction of the chair. Therefore, FIG. 2 shows an example of the measurement result of the position of the center of gravity in the sitting posture in the left-right direction of the chair and the measurement result of the position of the center of gravity in the sitting posture in the forward-backward direction of the chair. In FIG. 2, Δt is an example of the unit time.

Therefore, each of a 1-1st period, a 1-2nd period, a 1-3rd period, a 1-4th period, and a 1-5th period in FIG. 2 is an example of the unit time information. In addition, in the example shown in FIG. 2, each unit time information item is information having two time series of a time series of change in the position of the center of gravity in the sitting posture in the left-right direction over time and a time series of change in the position of the center of gravity in the sitting posture in the forward-backward direction over time. Therefore, the unit time series in the example shown in FIG. 2 is, for example, a time series having, as a sample, a two-dimensional vector in which one of elements indicates the position of the center of gravity in the sitting posture in the left-right direction and the other of the elements indicates the position of the center of gravity in the sitting posture in the forward-backward direction.

The unit classification process is a process that performs clustering on a unit time set generated by the unit time information generation process to determine classification conditions. That is, the unit classification process is a process that performs clustering to acquire the classification conditions. In addition, the classification conditions mean conditions satisfied by each cluster obtained by the clustering. The clustering may be any clustering method and may be, for example, a k-means method. The clustering method may be, for example, a clustering method using the random Markov process. The clustering method using the random Markov process is, for example, Toeplitz inverse covariance-based clustering (TICC) described in the following Reference Document 1.

Reference Document 1: D. Hallac, S Vare, et al. "Toeplitz inverse covariance-based clustering of multivariate time series data." Proceedings of the 23rd ACM SIGKDD International Conference on Knowledge Discovery and Data Mining. 2017.

Further, before the unit classification process is executed, a process (hereinafter, referred to as a "thinning process") that thins out samples of the time series indicated by the gravity center movement information or the unit time information, such as down sampling, may be executed.

The appearance pattern acquisition process is a process that estimates how the unit classification appears in each gravity center movement information item (hereinafter, referred to as an "appearance pattern") on the basis of the gravity center movement information and the result of the unit classification process. The unit classification means each classification (that is, each cluster) as the result of the unit classification process.

The appearance pattern acquisition process may be any method that estimates how predetermined information appears in given information. The appearance pattern acquisition process is, for example, a process that determines which unit classification each unit time information item belongs to for each unit time information item of the gravity center movement information. The appearance pattern acquisition process may be a method that estimates how predetermined information appears in given information using, for example, the hidden Markov process. The method that estimates how predetermined information appears in the given information using the hidden Markov process is, for example, Motif-Aware State Assignment (MASA) (Motif-Aware State Assignment in Noisy Time Series Data (patterns, regularities)) described in the following Reference Document 2.

Reference Document 2: S. Jain, D. Hallac, et al. "MASA: Motif-Aware State Assignment in Noisy Time Series Data." arXiv preprint arXiv: 1809.01819 (2018).

Specifically, the MASA described in Reference Document 2 is MASA based on the hidden Markov process for a fluctuating time series. For example, among the classifications obtained by the TICC described in Reference Document 1, an appearance pattern in the order of classification A, classification B, and classification C and an appearance pattern in the order of classification A, classification A, classification B, classification B, classification D, classification C, and classification C are classified as the same appearance pattern by the use of the MASA based on the hidden Markov process for the fluctuating time series.

That is, among the appearance pattern of classification A, classification A, classification B, classification B, classification D, classification C, and classification C, short-time classification D can be treated as not being present. Category D is also the result of the same unit classification process as that for Category A, Category B, and Category C. In addition, the MASA based on the hidden Markov process for the fluctuating time series is an example of an analysis algorithm for a fluctuating time series.

However, in a case in which a person sits on the chair, the person performs various actions. Therefore, even in the same classification, the time required to move the center of gravity may be different. In addition, a time interval in each classification may be different. Further, according to the experiment, in the appearance pattern of classification A, classification B, and classification C, even when the time length or appearance time interval of each classification is different, the influence of the difference on low back pain is the same. Therefore, for example, in a case in which it is determined that the influences of an appearance pattern A1 and an appearance pattern A2 on low back pain are different, the accuracy of estimating the occurrence of low back pain by the low back pain occurrence estimation system 100 is lower than that in the other cases.

In a case in which the low back pain occurrence estimation system 100 uses the MASA, the low back pain occurrence estimation system 100 can recognize the pattern of operation characteristics. Therefore, the low back pain occurrence estimation system 100 using the MASA has higher pattern detection accuracy than the low back pain occurrence estimation system 100 without using the MASA. In addition, the appearance pattern A1 is an appearance pattern in the order of classification A, classification A, classification B, classification B, classification D, classification C, and classification C. The appearance pattern A2 is an appearance pattern in the order of classification A, classification B, and classification C.

The common pattern determination process is a process that determines an appearance pattern which satisfies a condition (hereinafter, referred to as an "appearance frequency condition") related to the magnitude of the frequency of appearance among the appearance patterns obtained by the execution of the appearance pattern acquisition process. The appearance pattern determined by the common pattern determination process is an example of the gravity center movement common pattern. That is, the appearance pattern satisfying the appearance frequency condition is an example of the gravity center movement common pattern.

The appearance frequency condition is, for example, a condition from an appearance pattern having the highest frequency of appearance to an appearance pattern having the N-th highest frequency of appearance (N is a predetermined integer of 1 or greater) for a certain period. The appearance frequency condition may be, for example, the condition that the frequency of appearance is highest. The certain period is a predetermined period. In a case in which the certain period is actually used, the certain period is, for example, about 1 hour, and the frequency of appearance for that period is used. In addition, as the initial setting of forming the sitting situation data generation model, data corresponding to about one day as the period for which the appearance frequency condition is set may be used. For the data for about one day, for example, the time when the user sits on the chair and the way of sitting on the chair are not controlled and vary. The user sits on the chair for about 30 minutes to about 1 hour each time. The data for about one day is data obtained by collecting these for about one day.

Here, a specific example of training data (hereinafter, referred to as "first training data") used to update the low back pain occurrence estimation learning model in the low back pain occurrence estimation system 100 will be described. A supervised machine learning method is used to update the low back pain occurrence estimation learning model. Therefore, when the low back pain occurrence estimation learning model in the low back pain occurrence estimation system 100 is trained, the first training data that includes, as correct answer data, information indicating whether or not the cluster is a low back pain-related cluster is used.

The correct answer data is subject answer information for a period from the start time to the end time (hereinafter, referred to as "a period end time") of the low back pain determination period. The low back pain determination period is a predetermined period including the sitting period. The subject answer information is the result of evaluation obtained from the subject and is the result of the subject evaluating the degree of low back pain in 11 stages (including 0 without any pain). The subject is an example of the provider of the training data.

As described above, the correct answer data is information based on the cluster associated with the low back pain corresponding to the sitting situation data. The low back pain can be estimated by comparison with the gravity center movement common pattern obtained by the measurement of the sensor using the mathematical model (that is, the low back pain occurrence estimation learning model) obtained by training using the correct answer data and the sitting situation data determined as described above.

As described above, in an example of the first training data, the frequency of the appearance pattern and, for example, the subject answer information are associated with each other in advance. Since the frequency of the appearance pattern and the subject answer information are associated with each other in advance in the first training data, the low back pain occurrence estimation system 100 can obtain information indicating the correlation between a characteristic cluster obtained from the frequency of the appearance pattern and low back pain in a training stage.

In addition, the low back pain-related cluster is a cluster that satisfies a predetermined condition related to the degree of the correlation with low back pain. The predetermined condition related to the degree of the correlation with low back pain is, for example, the frequency of appearance of clusters in classification A "Stable State" and classification B "Slight sway" which will be described below.

Hereinafter, for simplicity of explanation, the low back pain occurrence estimation system 100 will be described using, as an example, a case in which the appearance pattern obtained by the common pattern determination process is the gravity center movement common pattern. Further, hereinafter, for simplicity of explanation, the low back pain occurrence estimation system 100 will be described using, as an example, a case in which the first training data includes the low back pain-related cluster as the correct answer data.

The common pattern appearance number acquisition process is a process that acquires the number of appearances of the gravity center movement common pattern for each gravity center movement information item. The common pattern appearance number acquisition process is, for example, a process that performs a number-of-times counting process for each gravity center movement information item. The number-of-times counting process is a process that repeatedly executes a process of acquiring a time-series difference, which is a difference between the time-series as an object to be compared and the gravity center movement common pattern, while changing the object to be compared and then acquires the number of objects to be compared having a time-series difference less than a predetermined difference. The time series as the object to be compared in the number-of-times counting process is specifically some of the time series indicated by the gravity center movement information.

The sitting situation data generation process is a process that obtains, as a pair of data, the number of appearances of the gravity center movement common pattern obtained by executing the common pattern appearance number acquisition process for the gravity center movement information and the length of the sitting period indicated by the gravity center movement information. The pair of data obtained by executing the sitting situation data generation process is an example of the sitting situation data. In the low back pain occurrence estimation system 100, the sitting situation data for each gravity center movement information item is acquired for each gravity center movement information item in this way.

The training data generation process includes a process that generates a pair of data of the sitting situation data obtained by the sitting situation data generation process and the correct answer data associated with each gravity center movement information item in advance. The training data generation process generates the first training data for each gravity center movement information item on the basis of at least the sitting situation data obtained by the sitting situation data generation process and the correct answer data associated with each gravity center movement information item in advance.

Hereinafter, a set of the first training data generated by the training data generation process is referred to as a training data set. In addition, a data set means a set of data. One or a plurality of first training data may be included in the training data set.

The training data set generation device 1, the low back pain occurrence estimation model acquisition device 2, the low back pain occurrence estimation device 3, the sensor 4, and the sitting situation data generation model acquisition device 5 will be described. First, the sitting situation data generation model acquisition device 5 will be described.

The sitting situation data generation model acquisition device 5 acquires a mathematical model (that is, a sitting situation data generation model) that generates the sitting situation data used to update the low back pain occurrence estimation learning model on the basis of on one or a plurality of gravity center movement information items.

The sitting situation data generation model is obtained by unsupervised machine learning using one or a plurality of gravity center movement information items. The sitting situation data generation model is, for example, a mathematical model that executes a process including at least the unit classification process, the appearance pattern acquisition process, the common pattern determination process, and the common pattern appearance number acquisition process for the gravity center movement information. The sitting situation data generation model may include the sitting situation data generation process. Hereinafter, the training data used to train the sitting situation data generation model is referred to as second training data. Since the sitting situation data generation model is obtained by the unsupervised machine learning using one or a plurality of gravity center movement information items, the gravity center movement information is an example of the second training data.

When the sitting situation data generation model is obtained by the unsupervised machine learning, the classification conditions obtained by the unit classification process are updated whenever the training is performed. As a result, the pattern acquired by the appearance pattern acquisition process and the pattern determined by the common pattern determination process are also updated. Therefore, the relationship between the gravity center movement information and the sitting situation data is updated by the update of the sitting situation data generation model by training.

The trained sitting situation data generation model acquired by the sitting situation data generation model acquisition device 5 is used by the training data set generation device 1 and the low back pain occurrence estimation device 3.

The training data set generation device 1 generates a training data set used to update the low back pain occurrence estimation learning model using the trained sitting situation data generation model. That is, the training data set generation device 1 generates the first training data using the trained sitting situation data generation model. The training data set generation device 1 generates the sitting situation data on the basis of the gravity center movement information. Specifically, the training data set generation device 1 converts the gravity center movement information into the sitting situation data.

In addition, the length of the sitting period is not necessarily the same for all of the gravity center movement information. That is, the length of the sitting period in at least one gravity center movement information item may be different from the length of the sitting period in another gravity center movement information item, or the length of the sitting period may be the same for all of the gravity center movement information.

The training data set generation device 1 executes the trained sitting situation data generation model to generate the sitting situation data. Specifically, for example, the training data set generation device 1 executes at least the unit time information generation process, the appearance pattern acquisition process, the common pattern appearance number acquisition process, the sitting situation data generation process, and the training data generation process to generate the sitting situation data.

The training data set generation device 1 uses the trained sitting situation data generation model. Therefore, when the training data set generation device 1 generates the sitting situation data, the classification conditions determined by the unit classification process have already been determined by the sitting situation data generation model acquisition device 5. Therefore, the training data set generation device 1 does not execute the unit classification process. This holds for the low back pain occurrence estimation device 3.

The training data set generation device 1 uses the trained sitting situation data generation model. Therefore, when the training data set generation device 1 generates the sitting situation data, the pattern determined by the common pattern determination process has already been determined by the sitting situation data generation model acquisition device 5. Therefore, the training data set generation device 1 does not execute the common pattern determination process. This holds for the low back pain occurrence estimation device 3.

The low back pain occurrence estimation model acquisition device 2 updates the low back pain occurrence estimation learning model by training using the training data set. Specifically, the low back pain occurrence estimation model acquisition device 2 updates the low back pain occurrence estimation learning model using the first training data included in the training data set. More specifically, the low back pain occurrence estimation model acquisition device 2 updates the low back pain occurrence estimation learning model using the machine learning method on the basis of the sitting situation data and the correct answer data included in the first training data. That is, the low back pain occurrence estimation model acquisition device 2 updates the low back pain occurrence estimation learning model using the machine learning method on the basis of the sitting situation data and the correct answer data corresponding to the sitting situation data.

The low back pain occurrence estimation model acquisition device 2 updates the low back pain occurrence estimation learning model until the training end condition is satisfied. The low back pain occurrence estimation learning model at the time when the training end condition is satisfied is the low back pain occurrence estimation model. In this way, the low back pain occurrence estimation model acquisition device 2 acquires the low back pain occurrence estimation model.

The low back pain occurrence estimation device 3 estimates the probability of low back pain occurring in a subject of analysis 9 on the basis of the gravity center movement information of the subject of analysis 9, for which the prediction of the occurrence of low back pain is to be performed, using the sitting situation data generation model and the low back pain occurrence estimation model. Specifically, first, the low back pain occurrence estimation device 3 generates the sitting situation data of the subject of analysis 9 using the sitting situation data generation model on the basis of the gravity center movement information of the subject of analysis 9 for which the prediction of the occurrence of low back pain is to be performed. Then, the low back pain occurrence estimation device 3 estimates the probability of low back pain occurring in the subject of analysis 9 on the basis of the generated sitting situation data, using the low back pain occurrence estimation model.

The probability of low back pain occurring is the probability that low back pain will occur after the end time of the low back pain determination period. Therefore, the probability of low back pain occurring in the subject of analysis 9 is the probability that low back pain will occur in the subject of analysis 9 after the end time of the low back pain determination period. The low back pain determination period is a predetermined period including the sitting period.

The predetermined period including the sitting period is, for example, the sitting period. The predetermined period including the sitting period may be, for example, the working time of the subject of analysis 9 that works at a desk in an office. The predetermined period including the sitting period may be, for example, a period from the time when the subject of analysis 9, that takes lessons at school, arrives at school to the time when the subject of analysis 9 returns home.

Figure 3:
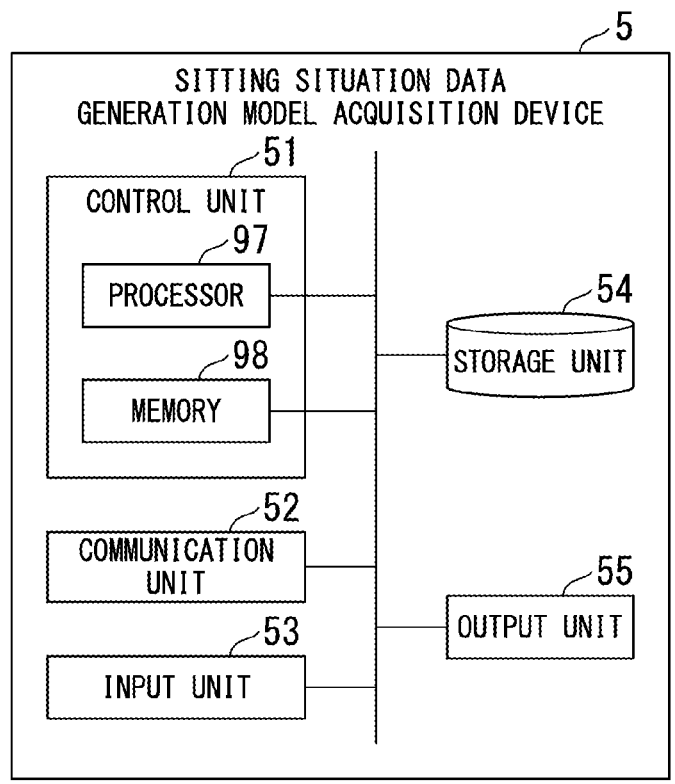
FIG. 3 is a diagram showing an example of a hardware configuration of a sitting situation data generation model acquisition device 5 in the embodiment.

FIG. 3 is a diagram showing an example of the hardware configuration of the sitting situation data generation model acquisition device 5 in the embodiment. The sitting situation data generation model acquisition device 5 includes a control unit 51 including a processor 97, such as a central processing unit (CPU), and a memory 98 which are connected by a bus and executes a program. The sitting situation data generation model acquisition device 5 executes the program to function as a device including the control unit 51, a communication unit 52, an input unit 53, a storage unit 54, and an output unit 55.

Specifically, in the sitting situation data generation model acquisition device 5, the processor 97 reads the program stored in the storage unit 54 and stores the read program in the memory 98. The processor 97 executes the program stored in the memory 98 such that the sitting situation data generation model acquisition device 5 functions as the device including the control unit 51, the communication unit 52, the input unit 53, the storage unit 54, and the output unit 55.

The control unit 51 controls the operation of each functional unit included in the sitting situation data generation model acquisition device 5. The control unit 51 trains, for example, the sitting situation data generation model. The control unit 51 records various kinds of information generated by training the sitting situation data generation model in the storage unit 54. The control unit 51 controls, for example, the operation of the communication unit 52.

The communication unit 52 is configured to include a communication interface for connecting the sitting situation data generation model acquisition device 5 to an external device. The communication unit 52 communicates with the external device wirelessly or in a wired manner. The external device which is the communication destination of the communication unit 52 is, for example, the training data set generation device 1 and the low back pain occurrence estimation device 3. For example, the communication unit 52 transmits the sitting situation data generation model to the training data set generation device 1 and the low back pain occurrence estimation device 3. For example, the communication unit 52 communicates with the transmission source of one or a plurality of gravity center movement information items input as the training data for updating the sitting situation data generation model. The communication unit 52 acquires one or a plurality of gravity center movement information items input as the training data for updating the sitting situation data generation model, using communication with the transmission source of one or a plurality of gravity center movement information items input as the training data for updating the sitting situation data generation model.

The input unit 53 is configured to include input devices such as a mouse, a keyboard, and a touch panel. The input unit 53 may be configured as an interface for connecting these input devices to the sitting situation data generation model acquisition device 5. The input unit 53 receives the input of various kinds of information to the sitting situation data generation model acquisition device 5. For example, as the training data for updating the sitting situation data generation model, one or a plurality of gravity center movement information items may be input to the input unit 53.

The storage unit 54 is configured using a non-temporary computer-readable storage medium device such as a magnetic hard disk device or a semiconductor storage device. The storage unit 54 stores various kinds of information related to the sitting situation data generation model acquisition device 5. The storage unit 54 stores, for example, a program for controlling the operation of each functional unit included in the sitting situation data generation model acquisition device 5 in advance. The storage unit 54 stores, for example, the sitting situation data generation model before the start of training in advance.

In addition, one or more gravity center movement information items input as the training data for updating the sitting situation data generation model are not necessarily input only to the communication unit 52 and are not necessarily input only to the input unit 53. One or more gravity center movement information items input as the training data for updating the sitting situation data generation model may be input from either the communication unit 52 or the input unit 53. Further, one or more gravity center movement information items input as the training data for updating the sitting situation data generation model are not necessarily acquired from the communication unit 52 or the input unit 53 and may be stored in the storage unit 54 in advance.

The output unit 55 outputs various kinds of information. For example, the output unit 55 is configured to include a display device such as a cathode ray tube (CRT) display, a liquid crystal display, or an organic electro-luminescence (EL) display. The output unit 55 may be configured as an interface for connecting these display devices to the sitting situation data generation model acquisition device 5. For example, the output unit 55 may display the information input to the communication unit 52 or the input unit 53.

Figure 4:
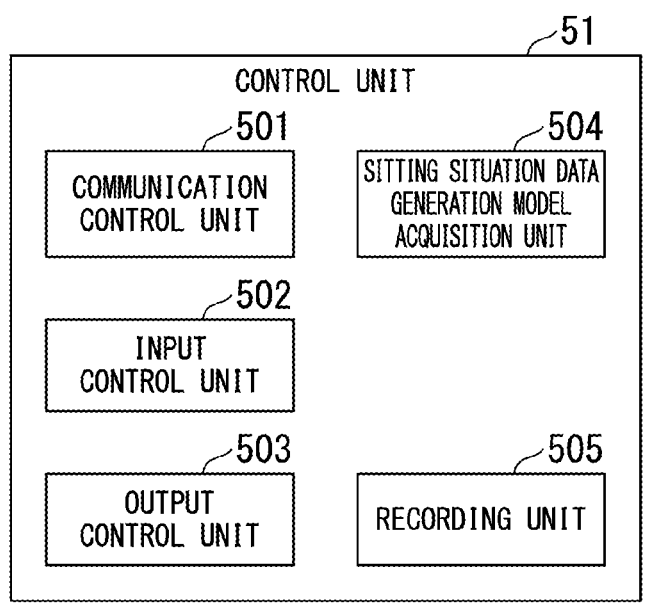
FIG. 4 is a diagram showing an example of a functional configuration of a control unit 51 in the embodiment.

FIG. 4 is a diagram showing an example of the functional configuration of the control unit 51 in the embodiment. The control unit 51 includes a communication control unit 501, an input control unit 502, an output control unit 503, a sitting situation data generation model acquisition unit 504, and a recording unit 505.

The communication control unit 501 controls the operation of the communication unit 52. The communication unit 52 transmits the acquired trained sitting situation data generation model to the training data set generation device 1 and the low back pain occurrence estimation device 3 under the control of the communication control unit 501. The communication control unit 501 acquires the information received by the communication unit 52. The input control unit 502 controls the operation of the input unit 53. The input control unit 502 acquires the information input to the input unit 53. The output control unit 503 controls the operation of the output unit 55.

The sitting situation data generation model acquisition unit 504 trains the sitting situation data generation model on the basis of the gravity center movement information input to the communication unit 52 or the input unit 53 until a predetermined end condition is satisfied. Specifically, the sitting situation data generation model acquisition unit 504 performs the unit time information generation process, the unit classification process, the appearance pattern acquisition process, the common pattern determination process, the common pattern appearance number acquisition process, and the sitting situation data generation process for each input gravity center movement information item.

As described above, the sitting situation data generation model includes the sitting situation data generation process. Whenever the sitting situation data generation model acquisition unit 504 performs the training, the classification conditions obtained by the unit classification process are updated. Further, since the sitting situation data generation model includes the common pattern determination process, the common pattern is updated to a more appropriate pattern whenever the sitting situation data generation model is updated by training. As a result, the accuracy of the sitting situation data generated by the sitting situation data generation model is improved by the training. The sitting situation data generation model at the time when the predetermined end condition is satisfied is the trained sitting situation data generation model.

In addition, in a case in which the gravity center movement information has been stored in the storage unit 54 in advance, the sitting situation data generation model acquisition unit 504 may read the gravity center movement information from the storage unit 54 and train the sitting situation data generation model on the basis of the read gravity center movement information.

The recording unit 505 records various kinds of information, such as the updated sitting situation data generation model, in the storage unit 14.

Figure 5:
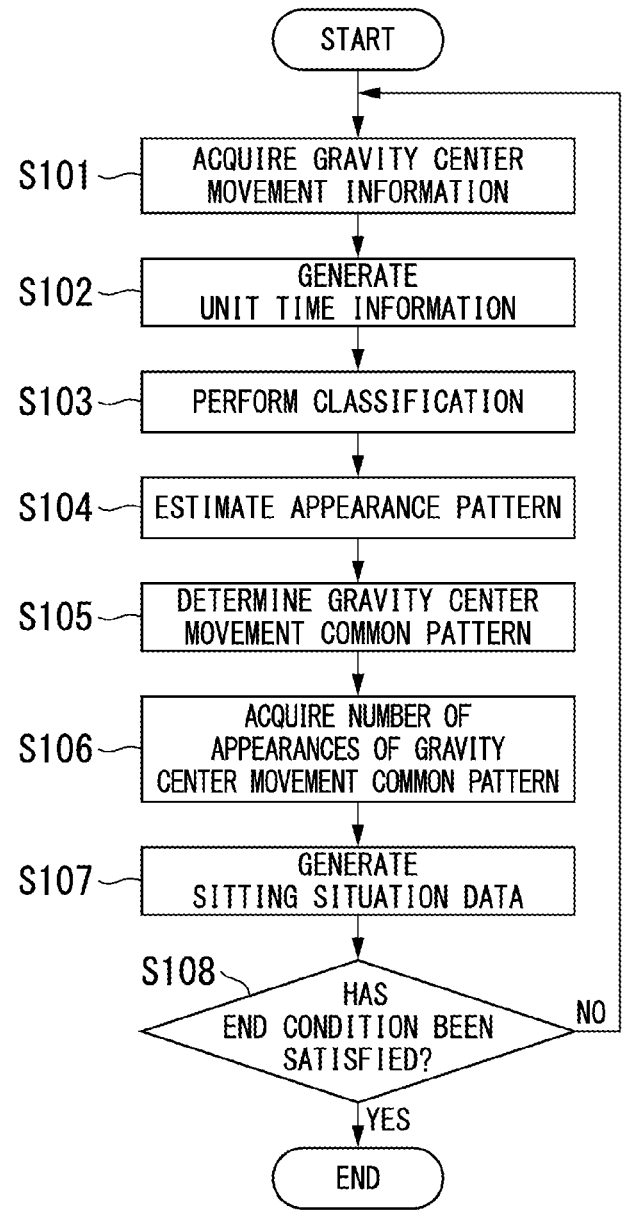
FIG. 5 is a flowchart showing an example of the flow of a process executed by the sitting situation data generation model acquisition device 5 in the embodiment.

FIG. 5 is a flowchart showing an example of the flow of a process executed by the sitting situation data generation model acquisition device 5 in the embodiment. Gravity center movement information for training is input to the communication unit 52 or the input unit 53 (Step S101). Then, the sitting situation data generation model acquisition unit 504 executes the unit time information generation process (Step S102). Then, the sitting situation data generation model acquisition unit 504 executes the unit classification process (Step S103). The classification conditions are updated by the execution of the unit classification process. Then, the sitting situation data generation model acquisition unit 504 executes the appearance pattern acquisition process (Step S104). Then, the sitting situation data generation model acquisition unit 504 executes the common pattern determination process (Step S105). The gravity center movement common pattern is updated by the execution of the common pattern determination process.

Then, the sitting situation data generation model acquisition unit 504 executes the common pattern appearance number acquisition process (Step S106). The number of appearances of the gravity center movement common pattern is acquired for each gravity center movement information item by the execution of the common pattern appearance number acquisition process. Then, the sitting situation data generation model acquisition unit 504 executes the sitting situation data generation process (Step S107). The sitting situation data is acquired for each gravity center movement information item by the execution of the sitting situation data generation process. Then, the sitting situation data generation model acquisition unit 504 determines whether or not the predetermined end condition is satisfied (Step S108). In a case in which the end condition is satisfied, the process ends. The sitting situation data generation model at the time when the process ends is the trained sitting situation data generation model. On the other hand, in a case in which the end condition is not satisfied, the process returns to Step S101.

In addition, the process in Step S107 is not necessarily executed, and the process in Step S108 may be executed after Step S106.

Figure 6:
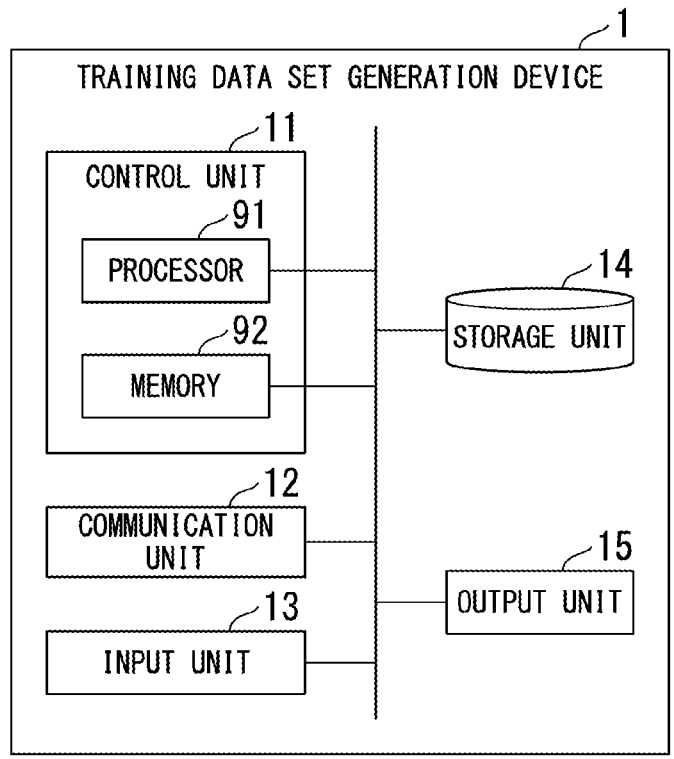
FIG. 6 is a diagram showing an example of a hardware configuration of a training data set generation device 1 in the embodiment.

FIG. 6 is a diagram showing an example of the hardware configuration of the training data set generation device 1 in the embodiment. The training data set generation device 1 includes a control unit 11 including a processor 91, such as a CPU, and a memory 92 which are connected by a bus and executes a program. The training data set generation device 1 executes the program to function as a device including the control unit 11, a communication unit 12, an input unit 13, a storage unit 14, and an output unit 15.

Specifically, in the training data set generation device 1, the processor 91 reads the program stored in the storage unit 14 and stores the read program in the memory 92. The processor 91 executes the program stored in the memory 92 such that the training data set generation device 1 functions as the device including the control unit 11, the communication unit 12, the input unit 13, the storage unit 14, and the output unit 15.

The control unit 11 controls the operation of each functional unit included in the training data set generation device 1. The control unit 11 executes, for example, the trained sitting situation data generation model. Specifically, the execution of the trained sitting situation data generation model is the execution of the unit time information generation process, the appearance pattern acquisition process, the common pattern appearance number acquisition process, and the sitting situation data generation process. The control unit 11 executes, for example, the training data generation process. For example, the control unit 11 records the execution result of the trained sitting situation data generation model and the execution result of the training data generation process on the storage unit 14. The control unit 11 controls, for example, the operation of the communication unit 12.

The communication unit 12 is configured to include a communication interface for connecting the training data set generation device 1 to an external device. The communication unit 12 communicates with the external device wirelessly or in a wired manner. The external device which is the communication destination of the communication unit 12 is, for example, the low back pain occurrence estimation model acquisition device 2. For example, the communication unit 12 transmits the training data set to the low back pain occurrence estimation model acquisition device 2.

The external device which is the communication destination of the communication unit 12 is, for example, the sitting situation data generation model acquisition device 5. The communication unit 12 acquires the trained sitting situation data generation model using communication with the sitting situation data generation model acquisition device 5.

For example, the external device which is the communication destination of the communication unit 12 may be a device which is the transmission source of the gravity center movement information and the correct answer data associated with each gravity center movement information item in advance. In this case, the communication unit 12 communicates with the device, which is the transmission source of the gravity center movement information and the correct answer data associated with each gravity center movement information item in advance, to receive the gravity center movement information and the correct answer data associated with each gravity center movement information item in advance.

The input unit 13 is configured to include input devices such as a mouse, a keyboard, and a touch panel. The input unit 13 may be configured as an interface for connecting these input devices to the training data set generation device 1. The input unit 13 receives the input of various kinds of information to the training data set generation device 1. For example, the gravity center movement information and the correct answer data associated with each gravity center movement information item in advance may be input to the input unit 13.

The storage unit 14 is configured using a non-temporary computer-readable storage medium device, such as a magnetic hard disk device or a semiconductor storage device. The storage unit 14 stores various kinds of information related to the training data set generation device 1. For example, the storage unit 14 stores a program for controlling the operation of each functional unit included in the training data set generation device 1 in advance. The storage unit 14 stores, for example, the trained sitting situation data generation model.

In addition, the gravity center movement information and the correct answer data associated with each gravity center movement information item in advance are not necessarily input only to the communication unit 12 and are not necessarily input only to the input unit 13. The gravity center movement information and the correct answer data associated with each gravity center movement information item in advance may be input from either the communication unit 12 or the input unit 13. For example, the gravity center movement information may be input to the communication unit 12, and the correct answer data corresponding to the gravity center movement information input to the communication unit 12 may be input to the input unit 13. Further, the gravity center movement information and the correct answer data associated with each gravity center movement information item in advance are necessarily acquired from the communication unit 12 or the input unit 13 and may be stored in the storage unit 14 in advance.

The output unit 15 outputs various kinds of information. The output unit 15 is configured to include a display device such as a cathode ray tube (CRT) display, a liquid crystal display, or an organic electro-luminescence (EL) display. The output unit 15 may be configured as an interface for connecting these display devices to the training data set generation device 1. The output unit 15 outputs, for example, the information input to the input unit 13. The output unit 15 may display, for example, the information input to the communication unit 12 or the input unit 13. The output unit 15 may display, for example, the generated sitting situation data. The output unit 15 may display, for example, the generated first training data.

Figure 7:
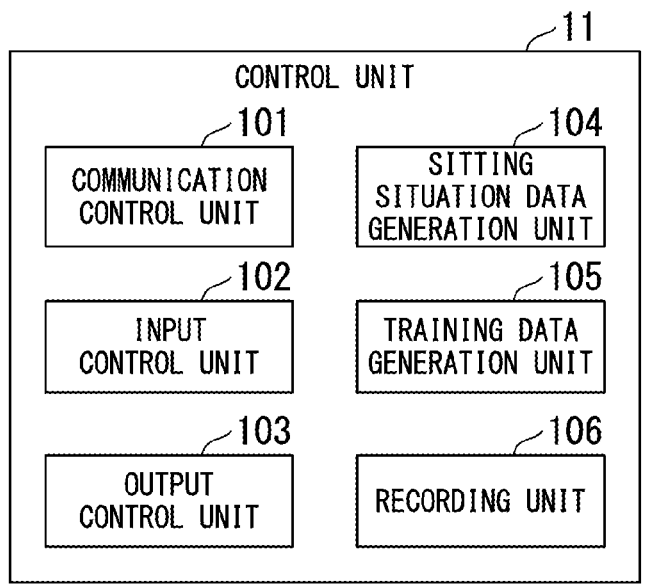
FIG. 7 is a diagram showing an example of a functional configuration of a control unit 11 in the embodiment.

FIG. 7 is a diagram showing an example of the functional configuration of the control unit 11 in the embodiment. The control unit 11 includes a communication control unit 101, an input control unit 102, an output control unit 103, a sitting situation data generation unit 104, a training data generation unit 105, and a recording unit 106.

The communication control unit 101 controls the operation of the communication unit 12. The communication unit 12 transmits the generated training data set to the low back pain occurrence estimation model acquisition device 2 under the control of the communication control unit 101. The communication unit 12 acquires the trained sitting situation data generation model from the sitting situation data generation model acquisition device 5 under the control of the communication control unit 101. The communication control unit 101 acquires the information received by the communication unit 12. The input control unit 102 controls the operation of the input unit 13. The input control unit 102 acquires the information input to the input unit 13. The output control unit 103 controls the operation of the output unit 15.

The sitting situation data generation unit 104 generates the sitting situation data on the basis of the gravity center movement information input to the communication unit 12 or the input unit 13. For example, the sitting situation data generation unit 104 executes the unit time information generation process, the appearance pattern acquisition process, the common pattern appearance number acquisition process, and the sitting situation data generation process to generate the sitting situation data on the basis of the gravity center movement information. In addition, in a case in which the gravity center movement information has been stored in the storage unit 14 in advance, the sitting situation data generation unit 104 may read the gravity center movement information from the storage unit 14 and generate the sitting situation data on the basis of the read gravity center movement information.

The training data generation unit 105 executes the training data generation process. The training data generation unit 105 executes the training data generation process to generate the first training data for each gravity center movement information item using at least the sitting situation data obtained by the sitting situation data generation process and the correct answer data associated with each gravity center movement information item in advance.

The recording unit 106 records various kinds of information on the storage unit 14.

Figure 8:
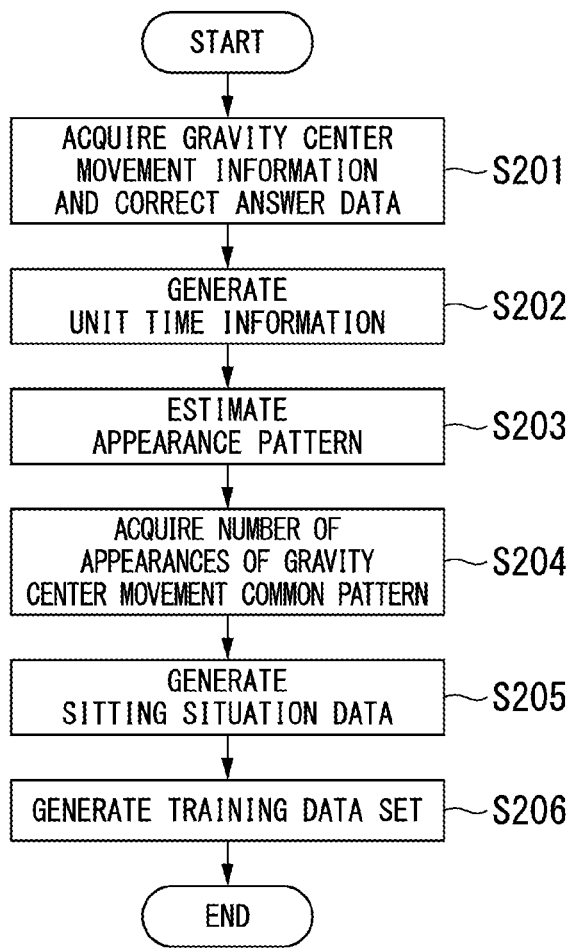
FIG. 8 is a flowchart showing an example of the flow of a process executed by the training data set generation device 1 in the embodiment.

FIG. 8 is a flowchart showing an example of the flow of a process executed by the training data set generation device 1 in the embodiment. In addition, before Step S201 is executed, the storage unit 14 has stored the trained sitting situation data generation model.

The gravity center movement information and the correct answer data associated with the gravity center movement information in advance are input to the communication unit 12 or the input unit 13 (Step S201). Then, the sitting situation data generation unit 104 executes the unit time information generation process (Step S202). Then, the sitting situation data generation unit 104 executes the appearance pattern acquisition process (Step S203).

Then, the sitting situation data generation unit 104 executes the common pattern appearance number acquisition process (Step S204). The number of appearances of the gravity center movement common pattern is acquired for the gravity center movement information acquired in Step S201 by the execution of the common pattern appearance number acquisition process. Then, the sitting situation data generation unit 104 executes the sitting situation data generation process (Step S205). The sitting situation data is acquired for each gravity center movement information item by the execution of the sitting situation data generation process. Then, the training data generation unit 105 executes the training data generation process for each gravity center movement information item (Step S206). The first training data is generated by the execution of the training data generation process. The flow of the process shown in FIG. 8 is repeated to generate the training data set.

Figure 9:
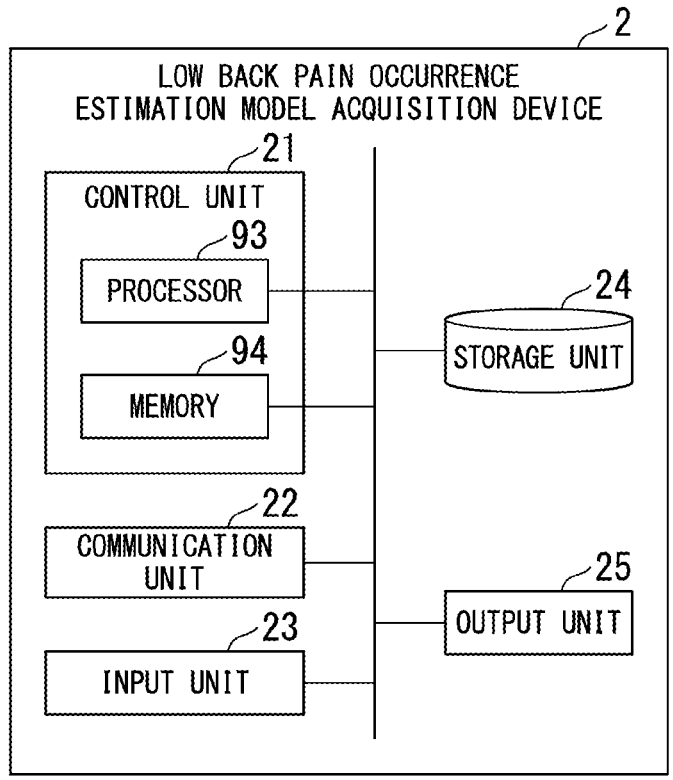
FIG. 9 is a diagram showing an example of a configuration of a low back pain occurrence estimation model acquisition device 2 in the embodiment.

FIG. 9 is a diagram showing an example of the configuration of the low back pain occurrence estimation model acquisition device 2 in the embodiment. The low back pain occurrence estimation model acquisition device 2 includes a control unit 21 including a processor 93, such as a CPU, and a memory 94 which are connected by a bus and executes a program. The low back pain occurrence estimation model acquisition device 2 executes the program to function as a device including the control unit 21, a communication unit 22, an input unit 23, a storage unit 24, and an output unit 25.

Specifically, in the low back pain occurrence estimation model acquisition device 2, the processor 93 reads the program stored in the storage unit 24 and stores the read program in the memory 94. The processor 93 executes the program stored in the memory 94 such that the low back pain occurrence estimation model acquisition device 2 functions as the device including the control unit 21, the communication unit 22, the input unit 23, the storage unit 24, and the output unit 25.

The control unit 21 controls the operation of each functional unit included in the low back pain occurrence estimation model acquisition device 2. The control unit 21 trains, for example, the low back pain occurrence estimation learning model. For example, the control unit 21 records the result of the training on the storage unit 24. For example, the control unit 21 controls the operation of the communication unit 22.

The communication unit 22 is configured to include a communication interface for connecting the low back pain occurrence estimation model acquisition device 2 to an external device. The communication unit 22 communicates with the external device wirelessly or in a wired manner. The external device which is the communication destination of the communication unit 22 is, for example, the training data set generation device 1. For example, the communication unit 22 receives the training data set transmitted by the training data set generation device 1. The external device which is the communication destination of the communication unit 22 is, for example, the low back pain occurrence estimation device 3. For example, the communication unit 22 transmits the low back pain occurrence estimation model to the low back pain occurrence estimation device 3.

The input unit 23 is configured to include input devices such as a mouse, a keyboard, and a touch panel. The input unit 23 may be configured as an interface for connecting these input devices to the low back pain occurrence estimation model acquisition device 2. The input unit 23 receives the input of various kinds of information to the low back pain occurrence estimation model acquisition device 2. For example, the training data set may be input to the input unit 23.

The storage unit 24 is configured using a non-temporary computer-readable storage medium device such as a magnetic hard disk device or a semiconductor storage device. The storage unit 24 stores various kinds of information related to the low back pain occurrence estimation model acquisition device 2. For example, the storage unit 24 stores a program for controlling the operation of each functional unit included in the low back pain occurrence estimation model acquisition device 2 in advance. For example, the storage unit 24 stores the low back pain occurrence estimation learning model in advance. For example, the storage unit 24 stores the updated low back pain occurrence estimation learning model.

In addition, the training data set is not necessarily input only to the communication unit 22 and is not necessarily input only to the input unit 23. Each information item included in the training data set may be input from either the communication unit 22 or the input unit 23.

The output unit 25 outputs various kinds of information. The output unit 25 is configured to include a display device such as a CRT display, a liquid crystal display, or an organic EL display. The output unit 25 may be configured as an interface for connecting these display devices to the low back pain occurrence estimation model acquisition device 2. The output unit 25 outputs, for example, the information input to the input unit 23. The output unit 25 may display, for example, the training data set input to the communication unit 22 or the input unit 23. The output unit 25 may display, for example, the execution result of the low back pain occurrence estimation learning model.

Figure 10:
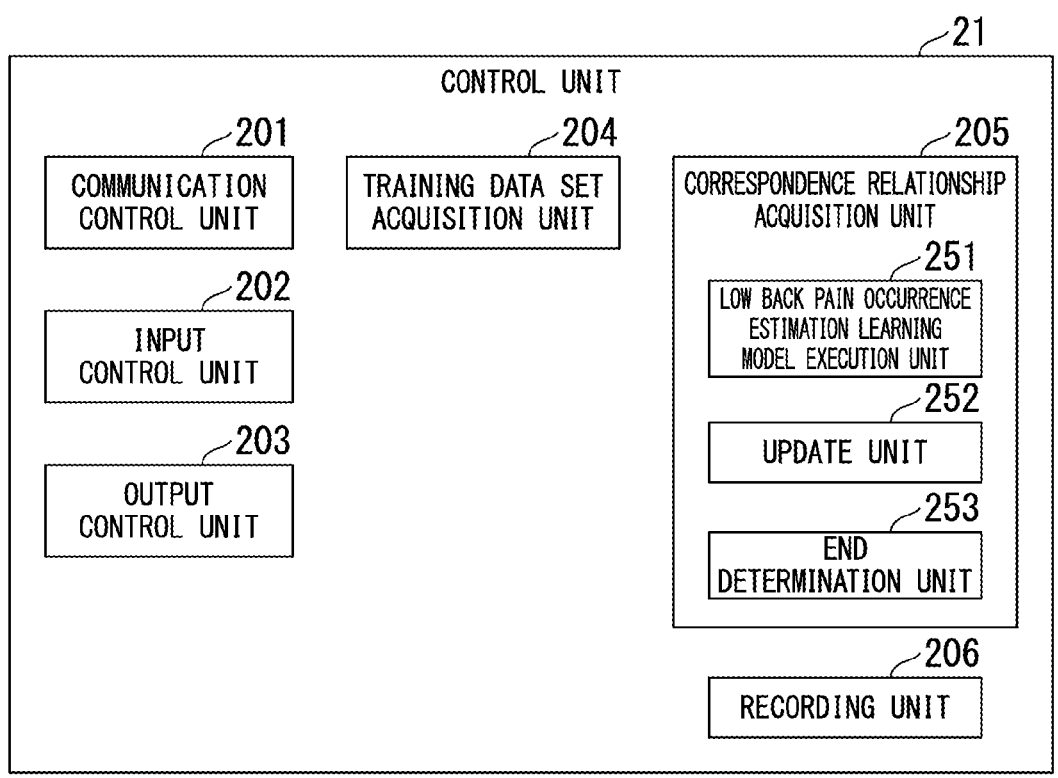
FIG. 10 is a diagram showing an example of a functional configuration of a control unit 21 in the embodiment.

FIG. 10 is a diagram showing an example of the functional configuration of the control unit 21 in the embodiment. The control unit 21 includes a communication control unit 201, an input control unit 202, an output control unit 203, a training data set acquisition unit 204, a correspondence relationship acquisition unit 205, and a recording unit 206.

The communication control unit 201 controls the operation of the communication unit 22. The communication unit 22 transmits the trained low back pain occurrence estimation learning model to the low back pain occurrence estimation device 3 under the control of the communication control unit 201. The input control unit 202 controls the operation of the input unit 23. The output control unit 203 controls the operation of the output unit 25.

The training data set acquisition unit 204 acquires the training data set input to the communication unit 22 or the input unit 23. In a case in which the training data set has been recorded on the storage unit 24 in advance, the training data set acquisition unit 204 may read the training data set from the storage unit 24.

The correspondence relationship acquisition unit 205 acquires the low back pain occurrence estimation model using the training data set. The correspondence relationship acquisition unit 205 includes a low back pain occurrence estimation learning model execution unit 251, an update unit 252, and an end determination unit 253.

The low back pain occurrence estimation learning model execution unit 251 executes the low back pain occurrence estimation learning model for the sitting situation data included in the first training data of the training data set acquired by the training data set acquisition unit 204. The low back pain occurrence estimation learning model execution unit 251 executes the low back pain occurrence estimation learning model to estimate the probability of low back pain occurring in a case in which the situation indicated by the sitting situation data occurs.

The update unit 252 updates the low back pain occurrence estimation learning model on the basis of an estimated loss which is the difference between the estimation result of the low back pain occurrence estimation learning model execution unit 251 and the correct answer data corresponding to the sitting situation data of the subject to be estimated by the low back pain occurrence estimation learning model execution unit 251.

The end determination unit 253 determines whether or not the training end condition is satisfied. The recording unit 206 records various kinds of information on the storage unit 24.

Figure 11:
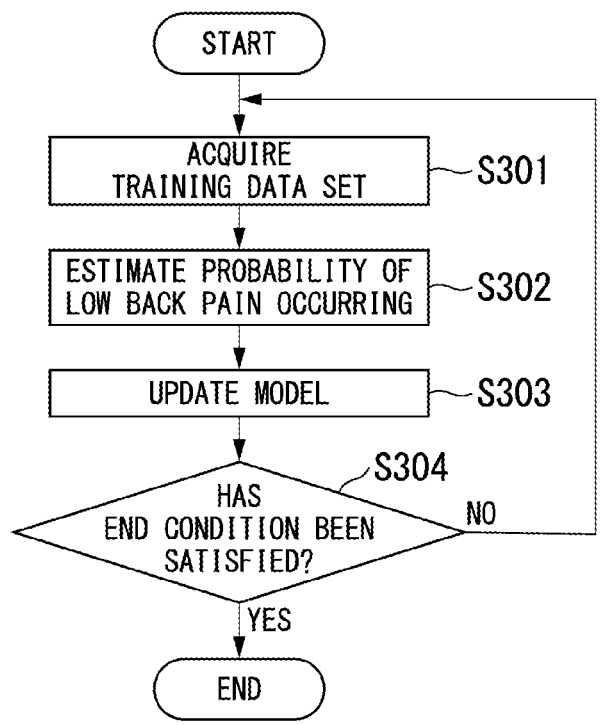
FIG. 11 is a flowchart showing an example of the flow of a process executed by the low back pain occurrence estimation model acquisition device 2 in the embodiment.

FIG. 11 is a flowchart showing an example of the flow of a process executed by the low back pain occurrence estimation model acquisition device 2 in the embodiment. The training data set is input to the communication unit 12 or the input unit 13, and the training data set acquisition unit 204 acquires the input training data set (Step S301).

Then, the low back pain occurrence estimation learning model execution unit 251 executes the low back pain occurrence estimation learning model for the sitting situation data included in the first training data of the training data set acquired in Step S301 (Step S302). The low back pain occurrence estimation learning model execution unit 251 executes the low back pain occurrence estimation learning model to estimate the probability of low back pain occurring in a case in which the situation indicated by the sitting situation data of the subject to be estimated occurs.

Then, the update unit 252 updates the low back pain occurrence estimation learning model on the basis of the difference between the estimation result obtained in Step S302 and the correct answer data corresponding to the sitting situation data of the subject to be estimated in Step S302 such that the difference is reduced (Step S303).

Then, the end determination unit 253 determines whether or not the training end condition is satisfied (Step S304). In a case in which the training end condition is satisfied (Step S304: YES), the process ends. The low back pain occurrence estimation learning model at the time when the process ends is an example of the low back pain occurrence estimation model. On the other hand, in a case in which the training end condition is not satisfied (Step S304: NO), the process returns to Step S301.

Figure 12:
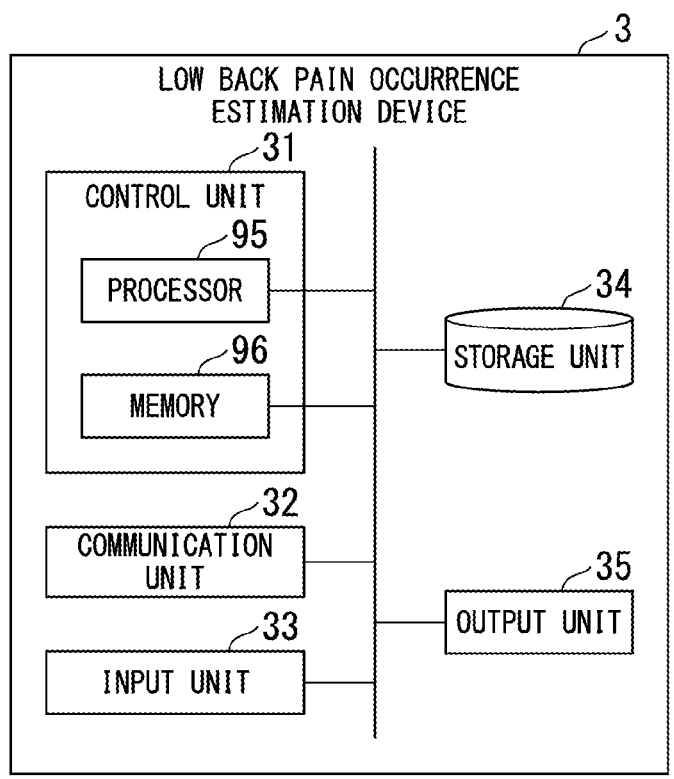
FIG. 12 is a diagram showing an example of a hardware configuration of a low back pain occurrence estimation device 3 in the embodiment.

FIG. 12 is a diagram showing an example of the hardware configuration of the low back pain occurrence estimation device 3 in the embodiment. The low back pain occurrence estimation device 3 includes a control unit 31 including a processor 95, such as a CPU, and a memory 96 which are connected by a bus and executes a program. The low back pain occurrence estimation device 3 executes the program to function as a device including the control unit 31, a communication unit 32, an input unit 33, a storage unit 34, and an output unit 35.

Specifically, in the low back pain occurrence estimation device 3, the processor 95 reads the program stored in the storage unit 34 and stores the read program in the memory 96. The processor 95 executes the program stored in the memory 96 such that the low back pain occurrence estimation device 3 functions as the device including the control unit 31, the communication unit 32, the input unit 33, the storage unit 34, and the output unit 35.

The control unit 31 controls the operation of each functional unit included in the low back pain occurrence estimation device 3. The control unit 31 executes, for example, the sitting situation data generation model. For example, the control unit 31 records the execution result of the sitting situation data generation model on the storage unit 34. For example, the control unit 31 executes the low back pain occurrence estimation model. For example, the control unit 31 records the execution result of the low back pain occurrence estimation model on the storage unit 34. The control unit 31 controls, for example, the operation of the communication unit 32.

The communication unit 32 is configured to include a communication interface for connecting the low back pain occurrence estimation device 3 to an external device. The communication unit 32 communicates with the external device wirelessly or in a wired manner. The external device which is the communication destination of the communication unit 32 is, for example, the low back pain occurrence estimation model acquisition device 2. The communication unit 32 receives, for example, the low back pain occurrence estimation model transmitted by the low back pain occurrence estimation model acquisition device 2.

The external device which is the communication destination of the communication unit 32 is, for example, the sitting situation data generation model acquisition device 5. The communication unit 32 communicates with the sitting situation data generation model acquisition device 5 to acquire the trained sitting situation data generation model.

The external device may be, for example, a device which is the transmission source of the gravity center movement information of the subject of analysis 9. In this case, the communication unit 32 communicates with the device which is the transmission source of the gravity center movement information of the subject of analysis 9 to receive the gravity center movement information of the subject of analysis 9.

The input unit 33 includes input devices such as a mouse, a keyboard, and a touch panel. The input unit 33 may be configured as an interface for connecting these input devices to the low back pain occurrence estimation device 3. The input unit 33 receives the input of various kinds of information to the low back pain occurrence estimation device 3. For example, the gravity center movement information of the subject of analysis 9 may be input to the input unit 33.

The storage unit 34 is configured using a non-temporary computer-readable storage medium device such as a magnetic hard disk device or a semiconductor storage device. The storage unit 34 stores various kinds of information related to the low back pain occurrence estimation device 3. For example, the storage unit 34 stores a program for controlling the operation of each functional unit included in the low back pain occurrence estimation device 3 in advance. For example, the storage unit 34 stores the low back pain occurrence estimation model acquired by the low back pain occurrence estimation model acquisition device 2. For example, the storage unit 34 stores the estimation result of the low back pain occurrence estimation model. For example, the storage unit 34 stores the trained sitting situation data generation model.

In addition, the low back pain occurrence estimation model, the trained sitting situation data generation model, and the gravity center movement information of the subject of analysis 9 are not necessarily input only to the communication unit 32 and are not necessarily input only to the input unit 33. The low back pain occurrence estimation model, the trained sitting situation data generation model, and the gravity center movement information of the subject of analysis 9 may be input from either the communication unit 32 or the input unit 33. Further, the trained sitting situation data generation model is not necessarily acquired from the communication unit 32 or the input unit 33 and may be stored in the storage unit 34 in advance.

The output unit 35 outputs various kinds of information. The output unit 35 includes display devices such as a CRT display, a liquid crystal display, and an organic EL display. The output unit 35 may be configured as an interface for connecting these display devices to the low back pain occurrence estimation device 3. For example, the output unit 35 outputs the information input to the input unit 33. For example, the output unit 35 may display the situation data input to the communication unit 32 or the input unit 33. For example, the output unit 35 may display the execution result of the low back pain occurrence estimation model.

Figure 13:
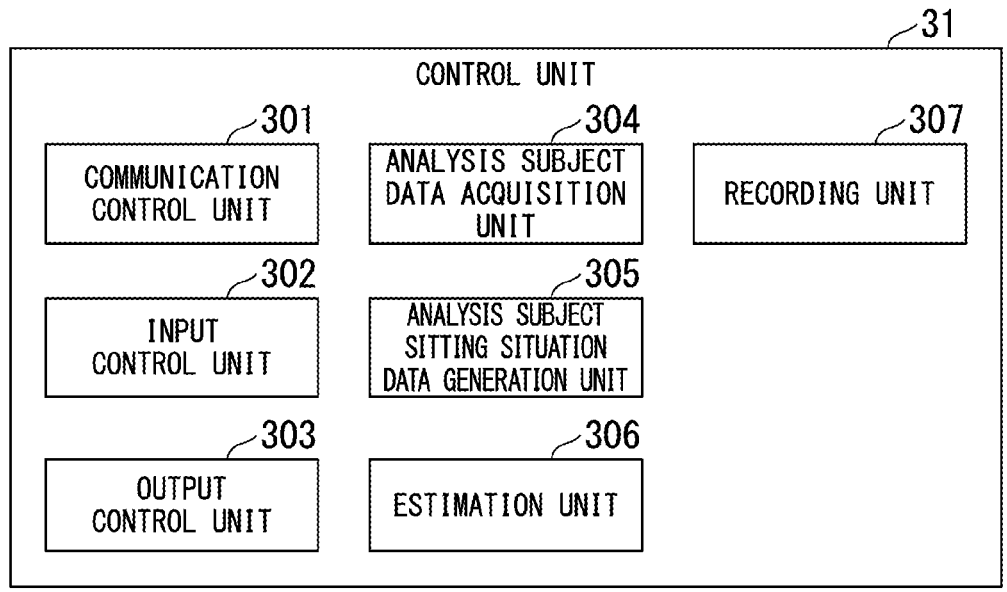
FIG. 13 is a diagram showing an example of a functional configuration of a control unit 31 in the embodiment.

FIG. 13 is a diagram showing an example of the functional configuration of the control unit 31 in the embodiment. The control unit 31 includes a communication control unit 301, an input control unit 302, an output control unit 303, an analysis subject data acquisition unit 304, an analysis subject sitting situation data generation unit 305, an estimation unit 306, and a recording unit 307.

The communication control unit 301 controls the operation of the communication unit 32. The input control unit 302 controls the operation of the input unit 33. The output control unit 303 controls the operation of the output unit 35.

The analysis subject data acquisition unit 304 acquires the gravity center movement information of the subject of analysis 9 input to the communication unit 32 or the input unit 33.

The analysis subject sitting situation data generation unit 305 executes the trained sitting situation data generation model based on the gravity center movement information of the subject of analysis 9 acquired by the analysis subject data acquisition unit 304 to acquire the sitting situation data of the subject of analysis 9. That is, the analysis subject sitting situation data generation unit 305 executes the trained sitting situation data generation model to convert the gravity center movement information of the subject of analysis 9 into the sitting situation data. For example, the analysis subject sitting situation data generation unit 305 executes the common pattern appearance number acquisition process and the sitting situation data generation process for the gravity center movement information of the subject of analysis 9 to generate the sitting situation data of the subject of analysis 9.

The estimation unit 306 executes the low back pain occurrence estimation model for the sitting situation data of the subject of analysis 9. The estimation unit 306 executes the low back pain occurrence estimation model to estimate the probability of low back pain occurring in the subject of analysis 9 in a case in which the situation indicated by the sitting situation data of the subject of analysis 9 occurs. The estimation unit 306 may calculate the frequency of appearance of the appearance pattern and estimate the low back pain on the basis of the frequency of appearance and the frequency of the appearance pattern that correlates with the low back pain. In addition, the estimation unit 306 may estimate the probability that low back pain will occur in the subject of analysis after the end time of the low back pain determination period on the basis of the sitting situation data related to the person who is the subject of analysis for which the prediction of the occurrence of low back pain is to be performed.

The recording unit 307 records various kinds of information on the storage unit 34. For example, the recording unit 307 records the gravity center movement information of the subject of analysis 9 input to the communication unit 32 or the input unit 33 on the storage unit 34. For example, the recording unit 307 records the execution result of the trained sitting situation data generation model on the storage unit 34. For example, the recording unit 307 records the execution result of the low back pain occurrence estimation model on the storage unit 34.

Figure 14:
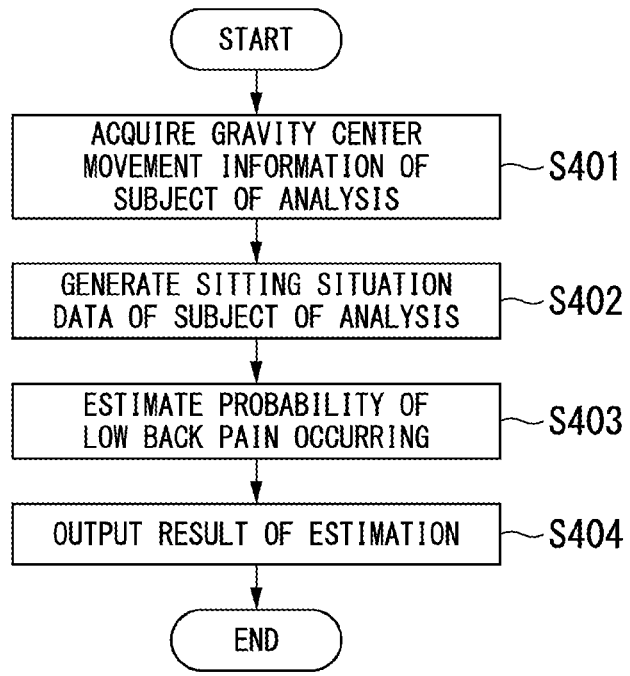
FIG. 14 is a flowchart showing an example of the flow of a process executed by the low back pain occurrence estimation device 3 in the embodiment.

FIG. 14 is a flowchart showing an example of the flow of a process executed by the low back pain occurrence estimation device 3 in the embodiment. Before the execution of Step S401, the storage unit 34 has stored the low back pain occurrence estimation model and the trained sitting situation data generation model.

The gravity center movement information of the subject of analysis 9 is input to the communication unit 22 or the input unit 23, and the analysis subject data acquisition unit 304 acquires the input gravity center movement information of the subject of analysis 9 (Step S401).

Then, the analysis subject sitting situation data generation unit 305 generates the sitting situation data of the subject of analysis 9 on the basis of the gravity center movement information of the subject of analysis 9 acquired in Step S401 (Step S402).

Then, the estimation unit 306 estimates the probability of low back pain occurring in the subject of analysis 9 in a case in which the situation indicated by the sitting situation data generated in Step S402 occurs, using the low back pain occurrence estimation model (Step S403).

Then, the output control unit 303 directs the output unit 35 to display the estimation result estimated in Step S403 (Step S404). In Step S404, a process in which the recording unit 307 records the estimation result on the storage unit 34 may be executed.

An example of the process executed by the low back pain occurrence estimation system 100 is summarized. In the low back pain occurrence estimation system 100, the process in Steps S101 to S108 is executed. In the low back pain occurrence estimation system 100, the process in Steps S201 to S206 is executed after the execution of Steps S101 to S108. In the low back pain occurrence estimation system 100, the process in Steps S301 to S304 is executed using the training data set obtained by the process in Steps S201 to S206. In the low back pain occurrence estimation system 100, the process in Steps S401 to S404 is executed after the process in Steps S301 to S304 is executed and after the process in Steps S101 to S108 is executed.

The low back pain occurrence estimation system 100 according to the embodiment which is configured in this way includes the low back pain occurrence estimation model acquisition device 2 that acquires the low back pain occurrence estimation model using the sitting situation data. The low back pain occurrence estimation model is an example of the correspondence relationship between the sitting situation data and the correct answer data corresponding to the sitting situation data. The sitting situation data includes information indicating the number of times a predetermined gravity center movement common pattern appears for the sitting period. Then, the correct answer data is information indicating a change in the probability of low back pain occurring after the end time of the low back pain determination period.

However, the low back pain caused by sitting on a chair is a phenomenon in which the probability of occurrence changes depending on how a person moves while sitting. Therefore, the inventors speculated that it would be possible to estimate the probability of low back pain occurring with higher accuracy when the correspondence relationship between how a person moves and a change in the probability of low back pain occurring could be obtained. The gravity center movement common pattern is information which indicates an example of a change in the position of the center of gravity of a person who sits on a chair, and the change in the position of the center of gravity of the person who sits on the chair is information reflecting how the person moves. The inventors found that a correlation as a correspondence relationship between how a person moved and a change in the probability of low back pain occurring was calculated using the low back pain occurrence estimation system 100 including the low back pain occurrence estimation model acquisition device 2 and there was a strong correlation between the occurrence of low back pain and the gravity center movement common pattern. The low back pain occurrence estimation system 100 can perform machine learning, using the low back pain occurrence estimation model as the low back pain occurrence estimation learning model, to estimate the probability of low back pain occurring with higher accuracy.

In addition, the low back pain occurrence estimation system 100 having the above-mentioned configuration according to the embodiment estimates the low back pain of the subject of analysis 9 using the low back pain occurrence estimation model. Therefore, the low back pain occurrence estimation system 100 can estimate the probability of low back pain occurring with higher accuracy.

MODIFICATION EXAMPLES

In addition, the low back pain occurrence estimation learning model is represented by, for example, a neural network having an input layer, a plurality of intermediate layers, and an output layer. Parameters of the neural network are suitably adjusted on the basis of the value of an objective function (for example, loss). The parameters of the neural network are parameters of a machine learning model to be represented. In addition, the parameters of the neural network are parameters of circuits constituting the neural network.

The low back pain occurrence estimation learning model is, for example, a probabilistic neural network described in Reference Document 3 and the like.

Reference Document 3: Specht, Donald F. "Probabilistic neural networks." Neural networks 3.1 (1990): 109-118.

Deep learning by the probabilistic neural network is used to estimate the aggravation of low back pain. A function for optimizing the output of the neural network may be, for example, a social spider algorithm (SSA). In addition, when a cross-entropy loss function is used, the aggravation of low back pain can be estimated with higher accuracy and specificity than that when the cross-entropy loss function is not used. The estimation of the aggravation of low back pain means that the low back pain has been aggravated (the low back pain has occurred) and that the low back pain has not changed (the low back pain has not occurred).

In addition, the high accuracy of the machine learning model means that the probability that the estimation result by the machine learning model will be correct is high. The specificity means that, for example, not the aggravation of shoulder stiffness but the aggravation of low back pain can be predicted.

In addition, various factors other than the content indicated by the sitting situation data may affect the occurrence of low back pain. Therefore, in a case in which various factors other than the content indicated by the sitting situation data affect the occurrence of low back pain, the training data may include not only the pair of the sitting situation data and the correct answer data but also information related to the sex of a provider of the sitting situation data, the lifestyle of the provider, and information related to the physical condition of the provider. In addition, the training data may include information indicating the subjective evaluation result of low back pain by the provider of the sitting situation data. The information indicating the subjective evaluation result of low back pain is, for example, information indicating how to feel the low back pain. As the amount of information other than the pair of the sitting situation data and the correct answer data included in the training data becomes larger, the low back pain occurrence estimation model acquisition device 2 can generate the low back pain occurrence estimation model with higher accuracy.

Experimental Results

Here, an example of the result of experiment on the prediction of the probability of low back pain occurring using the low back pain occurrence estimation system 100 will be described with reference to FIGS. 15 to 17. The experiment was performed on 30 subjects for four months. In the experiment, a change in the position of the center of gravity of the subject for the period for which the subject is sitting on a chair for experiment (hereinafter, referred to as an "experimental chair") is measured. The experimental chair is a chair having load sensors attached thereto. Specifically, the experimental chair is a chair in which load sensors are installed at four positions under a seat surface and a three-axis accelerometer is installed at one position under the seat surface. In the experiment, specifically, a change in the position of the center of gravity over time was calculated on the basis of the measurement results of the load sensors and the three-axis accelerometer. The calculated change in the position of the center of gravity over time is an example of the gravity center movement information. The sampling rate of the load sensor was 100 Hz.

In the experiment, the subject performed two predetermined tasks four times at 9 am, 11:30 am, 2 pm, and 5 pm every day. One of the predetermined tasks is a task of evaluating the degree of sleepiness of the subject. An answer to drowsiness was obtained by the Karolinska Sleepiness Scale. The other of the predetermined tasks is a task of evaluating three items of sleepiness self-evaluation, pain self-evaluation, and work self-evaluation. For pain, answers to the whole body, the shoulders, and the hips were obtained. The answers were obtained by the Visual Analog Scale.

In the experiment, the subject answered POMS2 which is a mood scale and Athens Insomnia Scale which is an insomnia scale once a week.

In the experiment, the subject sat on the experimental chair at work every day. In the experiment, the subject performed normal work after sitting on the experimental chair at work. In a case in which the subject sits on the chair during normal work, the chair on which the subject sits is the experimental chair. While the subject was sitting on the experimental chair, a change in the position of the center of gravity was measured.

In the experiment, the subject wore a wristwatch-type activity meter except when taking a bath. Specifically, the activity meter was an activity meter using an acceleration sensor. In addition, for the measurement of pain other than low back pain or measurement using a spirometer, other correlations with data, such as the position of the center of gravity in the sitting posture, were measured.

In the experiment, the result of experiment, such as the gravity center movement information, was obtained from 30 subjects in this experimental environment.

Figure 15:
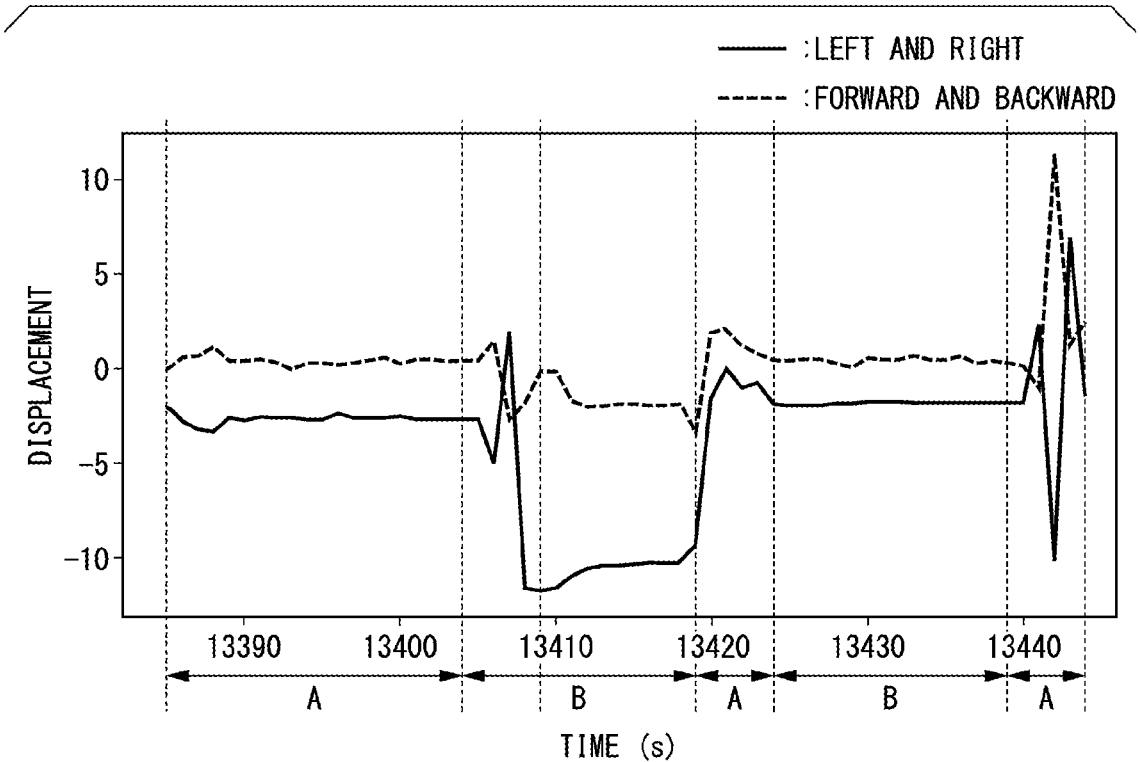
FIG. 15 is a diagram showing a first example of the result of an appearance pattern acquisition process obtained by an experiment.
Figure 16:
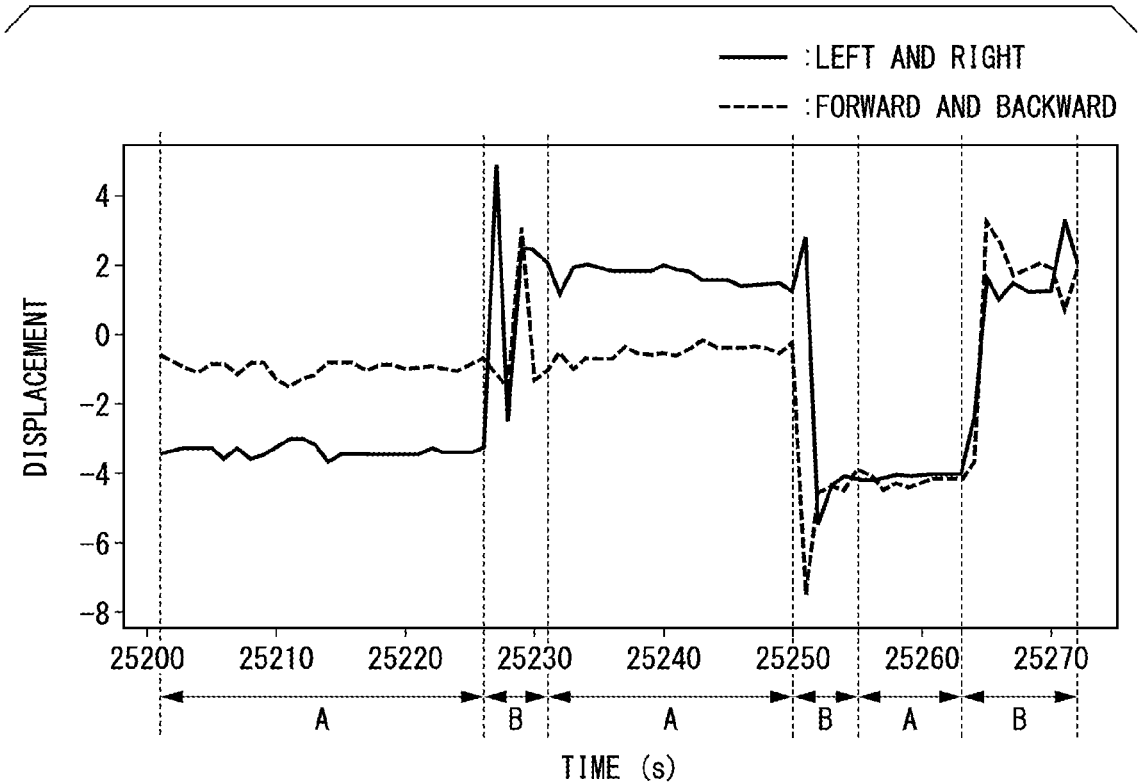
FIG. 16 is a diagram showing a second example of the result of the appearance pattern acquisition process obtained by the experiment.
Figure 17:
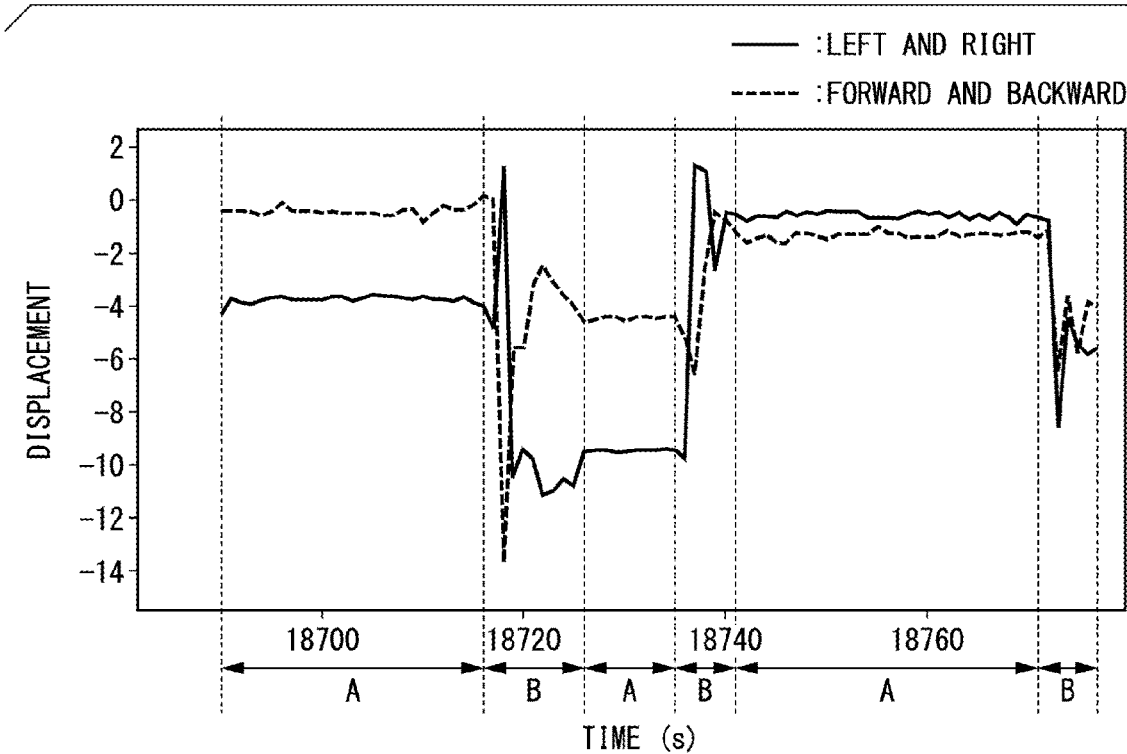
FIG. 17 is a diagram showing a third example of the result of the appearance pattern acquisition process obtained by the experiment.

FIGS. 15 to 17 are diagrams showing an example of the position of the center of gravity obtained from the subjects as the result of the appearance pattern acquisition process obtained in the experiment. In FIGS. 15 to 17, the vertical axis indicates the displacement of the position of the center of gravity, and the horizontal axis indicates a measurement time. In FIGS. 15 to 17, a dotted line graph (that is, a graph represented by "forward and backward") indicates the displacement in the forward-backward direction. In FIGS. 15 to 17, a solid line graph (that is, a graph represented by "left and right") indicates the displacement in the left-right direction. FIGS. 15 to 17 show that classification A and classification B appear alternately. In addition, in the experiment, classification A was "Stable State", and classification B was "Slight sway". Classification A means "a state in which the center of gravity is stable (still) at an almost constant position". Classification B means "a state in which the center of gravity is moved a little by, for example, the shaking of the body".

In addition, the actions that were temporarily performed were mainly classified into a state in which there was a large change in the center of gravity due to, for example, the raising of the low back (classification C) and a state in which, for example, the subject stood up from the chair and moved away from the chair (classification D) in the experiment.

FIGS. 15 to 17 show that the patterns of classification A and classification B appear alternately. FIGS. 15 to 17 show that the pattern in which classification A and classification B appear alternately is a basic pattern and that, in a case in which this pattern appears frequently for a predetermined period, the subject is less likely to suffer from low back pain.

On the other hand, FIGS. 15 to 17 show the result that low back pain is highly likely to occur in a case in which the frequency of appearance of classification A and classification B is low for a predetermined period. For example, FIGS. 15 to 17 show that low back pain occurs at a high rate in the following cases: a case in which the frequency of appearance of classification A and classification B is low for a predetermined period, for example, a case in which classification B appears after the period of classification A continues for a long time and the period of classification A continues for a while; and a case in which classification C appears many times in the patterns of classification A and classification B, the appearance of classification A and classification B does not continue many times, and the frequency of appearance of classification A and classification B is low for the whole predetermined period.

When the experimenter calculated the low back pain occurrence estimation system 100 using an SSA-PNN model and determined the ratio of the frequencies of appearance of classifications A and classification B, the determination accuracy of low back pain was about 63%. In addition, for the determination of specificity, a high accuracy of about 69% could be obtained. This result shows that the low back pain occurrence estimation system 100 can determine whether or not the user who sits on various chairs has low back pain with high accuracy and very high probability.

In addition, as described above, the low back pain occurrence estimation system 100 can estimate the occurrence of low back pain. In addition, the low back pain occurrence estimation system 100 may prevent the occurrence of low back pain by alerting the user to the occurrence of low back pain.

The following is obtained from the experimental result: in a case in which the ratio of the frequencies of appearance of classification A and classification B is low for a predetermined period and it is estimated that the user will have low back pain at this rate, it is possible to prevent the occurrence of low back pain or to reduce the degree of low back pain by, for example, giving a warning to the user to prompt the user to improve the posture or by giving a predetermined exercise to the user. In addition, the term "at this rate" means that the same sitting posture continues.

As described above, the low back pain occurrence estimation system 100 according to the invention can classify the sitting situation at the center of gravity in the sitting posture and analyze the pattern to estimate the possibility that low back pain will occur, for example, whether low back pain occurs (is aggravated) or not, from the frequency of appearance of predetermined patterns (classification A and classification B).

In addition, the estimation is performed with higher accuracy and at a higher speed by machine learning. After sitting data corresponding to about one hour is obtained from the user who uses the chair for the first time, the low back pain occurrence estimation system 100 can obtain the determination of another user in a few minutes.

In addition, the communication unit 12, the communication unit 22, and the communication unit 32 may be configured to include an interface for connection to an external storage device such as a universal serial bus (USB) memory that stores various kinds of information. In this case, the communication unit 12, the communication unit 22, and the communication unit 32 may output information to the external storage device which is a connection destination.

Further, the training data set generation device 1 and the low back pain occurrence estimation model acquisition device 2 are not necessarily mounted as different devices. For example, the training data set generation device 1 and the low back pain occurrence estimation model acquisition device 2 may be mounted as one device having the functions of the two devices.

For example, the control unit 21 of the low back pain occurrence estimation model acquisition device 2 may further include the sitting situation data generation unit 104 and the training data generation unit 105. The control unit 21 may perform the unit time information generation process, the appearance pattern acquisition process, the common pattern appearance number acquisition process, the sitting situation data generation process, and the training data generation process. In this case, the gravity center movement information and the correct answer data associated with each gravity center movement information item in advance are input to the communication unit 22 or the input unit 23. Further, in this case, the low back pain occurrence estimation system 100 does not need to include the training data set generation device 1.

In addition, the low back pain occurrence estimation model acquisition device 2 and the low back pain occurrence estimation device 3 are not necessarily mounted as different devices. For example, the low back pain occurrence estimation model acquisition device 2 and the low back pain occurrence estimation device 3 may be mounted as one device having the functions of the two devices.

For example, the control unit 31 of the low back pain occurrence estimation device 3 may further include the training data set acquisition unit 204, the low back pain occurrence estimation learning model execution unit 251, the update unit 252, and the end determination unit 253. The control unit 31 may further perform the update of the low back pain occurrence estimation learning model and the acquisition of the low back pain occurrence estimation model. In this case, the training data set is also input to the communication unit 32 or the input unit 33.

Furthermore, the low back pain occurrence estimation system 100 may be mounted as a system using a plurality of information processing devices which are connected through a network such that they can communicate with each other. In this case, each functional unit included in the training data set generation device 1, the low back pain occurrence estimation model acquisition device 2, and the low back pain occurrence estimation device 3 may be distributed and mounted in the plurality of information processing devices.

Moreover, for example, the low back pain occurrence estimation system 100 may be mounted as one low back pain analysis device 6.

Figure 18:
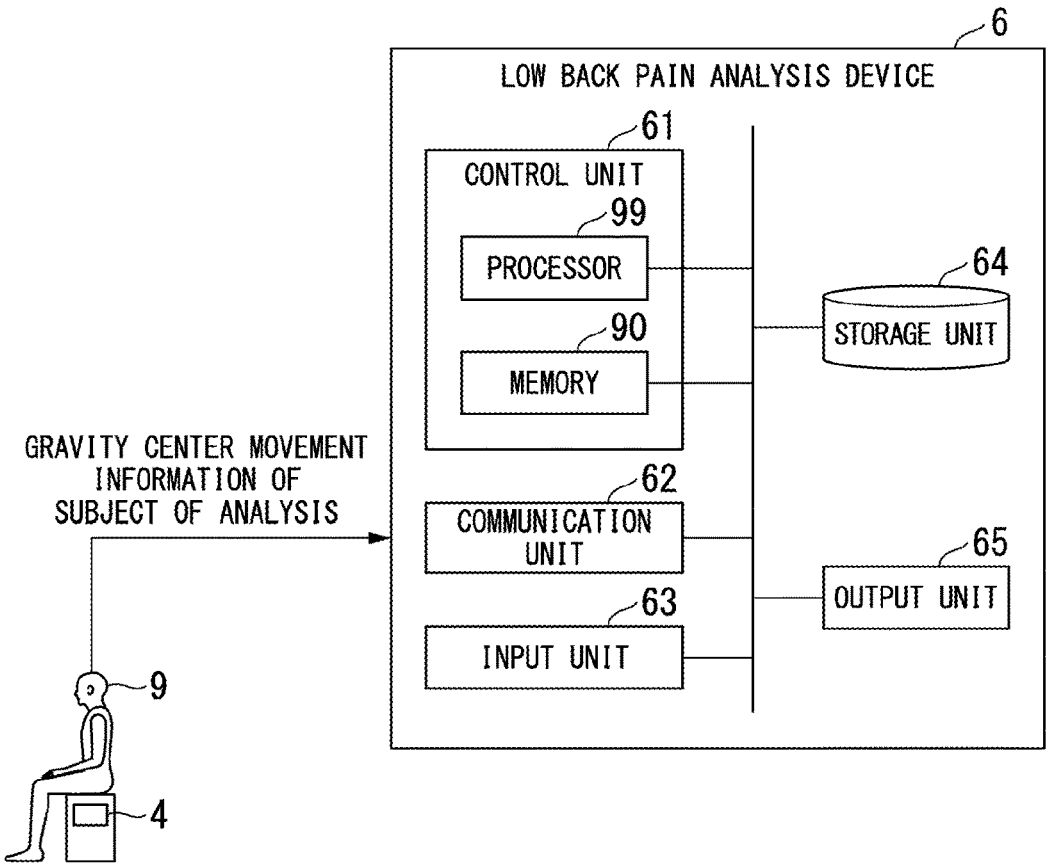
FIG. 18 is a diagram showing an example of a hardware configuration of a low back pain analysis device 6 according to a modification example.

FIG. 18 is a diagram showing an example of the hardware configuration of the low back pain analysis device 6 in a modification example. The low back pain analysis device 6 includes a control unit 61 including a processor 99, such as a central processing unit (CPU), and a memory 90 which are connected by a bus and executes a program. The low back pain analysis device 6 executes the program to function as a device including a control unit 61, a communication unit 62, an input unit 63, a storage unit 64, and an output unit 65.

Specifically, in the low back pain analysis device 6, the processor 99 reads the program stored in the storage unit 64 and stores the read program in the memory 90. The processor 99 executes the program stored in the memory 90 such that the low back pain analysis device 6 functions as the device including the control unit 61, the communication unit 62, the input unit 63, the storage unit 64, and the output unit 65.

The control unit 61 controls the operation of each functional unit included in the low back pain analysis device 6. For example, the control unit 61 trains the sitting situation data generation model. For example, the control unit 61 trains the low back pain occurrence estimation learning model. For example, the control unit 61 estimates the probability of low back pain occurring in the subject of analysis 9 using the low back pain occurrence estimation model.

The communication unit 62 includes a communication interface for connecting the low back pain analysis device 6 to an external device. The communication unit 62 communicates with the external device wirelessly or in a wired manner. For example, the external device which is the communication destination of the communication unit 62 may be a device which is the transmission source of the gravity center movement information of the subject of analysis 9. In this case, the communication unit 62 communicates with the device which is the transmission source of the gravity center movement information of the subject of analysis 9 to receive the gravity center movement information of the subject of analysis 9.

The input unit 63 is configured to include input devices such as a mouse, a keyboard, and a touch panel. The input unit 63 may be configured as an interface for connecting these input devices to the low back pain analysis device 6. The input unit 63 receives the input of various kinds of information to the low back pain analysis device 6. For example, the gravity center movement information of the subject of analysis 9 may be input to the input unit 63.

Further, information (hereinafter, referred to as "operation mode instruction information") indicating an operation mode of the low back pain analysis device 6 is input to the communication unit 62 or the input unit 63. The operation modes of the low back pain analysis device 6 are a sitting situation data generation model training mode, a low back pain occurrence estimation learning model training mode, and an analysis mode.

The sitting situation data generation model training mode is an operation mode in which the low back pain analysis device 6 trains the sitting situation data generation model using the data input to the communication unit 62 or the input unit 63. The low back pain occurrence estimation learning model training mode is an operation mode in which the low back pain analysis device 6 trains the low back pain occurrence estimation learning model using the data input to the communication unit 62 or the input unit 63. The analysis mode is an operation mode in which the low back pain analysis device 6 estimates the probability of low back pain occurring in the subject of analysis 9 using the data input to the communication unit 62 or the input unit 63.

The operation mode instruction information input to the communication unit 62 or the input unit 63 indicates any one of the sitting situation data generation model training mode, the low back pain occurrence estimation learning model training mode, and the analysis mode.

The gravity center movement information is input to the communication unit 62 or the input unit 63. The correct answer data is input to the communication unit 62 or the input unit 63. The gravity center movement information of the subject of analysis 9 is input to the communication unit 62 or the input unit 63.

In a case in which the operation mode instruction information indicating the sitting situation data generation model training mode and the gravity center movement information are input, the low back pain analysis device 6 operates in the sitting situation data generation model training mode to update the sitting situation data generation model.

In a case in which the operation mode instruction information indicating the low back pain occurrence estimation learning model training mode, the gravity center movement information, and the correct answer data are input, the low back pain analysis device 6 operates in the low back pain occurrence estimation learning model training mode to update the low back pain occurrence estimation learning model.

In a case in which the operation mode instruction information indicating the analysis mode and the gravity center movement information are input, the low back pain analysis device 6 operates in the analysis mode to estimate the probability of low back pain occurring in a person who has performed the movement of the center of gravity in the sitting posture indicated by the input gravity center movement information on the basis of the input gravity center movement information.

The storage unit 64 is configured using a non-temporary computer-readable storage medium device such as a magnetic hard disk device or a semiconductor storage device. The storage unit 64 stores various kinds of information related to the low back pain analysis device 6. For example, the storage unit 64 stores a program for controlling the operation of each functional unit included in the low back pain analysis device 6 in advance. For example, the storage unit 64 stores the sitting situation data generation model in advance before the start of training. For example, the storage unit 64 stores the low back pain occurrence estimation learning model in advance.

The output unit 65 outputs various kinds of information. The output unit 65 includes display devices such as a CRT display, a liquid crystal display, and an organic EL display. The output unit 65 may be configured as an interface for connecting these display devices to the low back pain analysis device 6. For example, the output unit 65 may display the information input to the communication unit 62 or the input unit 63.

Figure 19:
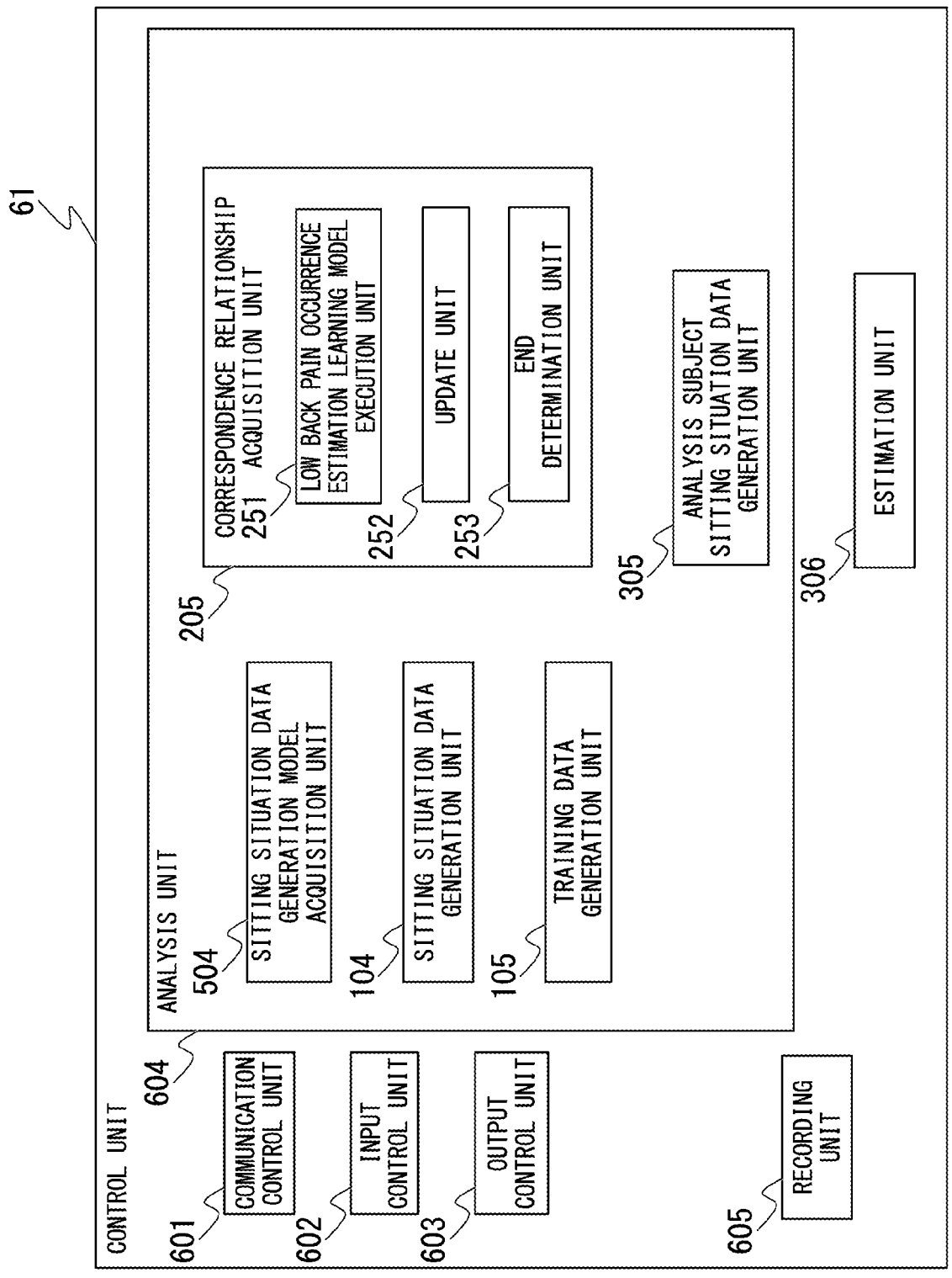
FIG. 19 is a diagram showing an example of a functional configuration of a control unit 61 in the modification example.

FIG. 19 is a diagram showing an example of the functional configuration of the control unit 61 in the modification example. The control unit 61 includes a communication control unit 601, an input control unit 602, an output control unit 603, an analysis unit 604, the estimation unit 306, and a recording unit 605. Hereinafter, functional units having the same functions as the functional units shown in FIGS. 1 to 18 will be denoted by the same reference numerals as those in FIGS. 1 to 18 and a description thereof will not be repeated.

The communication control unit 601 controls the operation of the communication unit 62. The communication control unit 601 acquires the information received by the communication unit 62. The input control unit 602 controls the operation of the input unit 63. The input control unit 602 acquires the information input to the input unit 63. The output control unit 603 controls the operation of the output unit 65.

The analysis unit 604 includes the sitting situation data generation unit 104, the training data generation unit 105, the correspondence relationship acquisition unit 205, the analysis subject sitting situation data generation unit 305, and the sitting situation data generation model acquisition unit 504. Therefore, the analysis unit 604 can update the sitting situation data generation model, generate the sitting situation data, and update the low back pain occurrence estimation learning model. That is, the analysis unit 604 can obtain the relationship between the result of the pattern and low back pain, using the result of the pattern obtained by classifying the gravity center movement information acquired by the sensors 4 using clustering. The sensor 4 is an example of a device that acquires the gravity center movement information for the sitting period.

The recording unit 605 records various kinds of information on the storage unit 64. For example, the recording unit 605 records the information input to the communication unit 62 or the input unit 63 on the storage unit 64. For example, the recording unit 605 records various kinds of information generated by the operation of the analysis unit 604 on the storage unit 64.

Since the low back pain analysis device 6 includes the analysis unit 604, it can execute each process in Steps S101 to S108, Steps S201 to S206, Steps S301 to S304, and Steps S401 to S402 according to the input operation mode instruction information in the same manner as the low back pain occurrence estimation system 100.

In addition, all or some of the functions of the training data set generation device 1, the low back pain occurrence estimation model acquisition device 2, the low back pain occurrence estimation device 3, the sitting situation data generation model acquisition device 5, and the low back pain analysis device 6 may be implemented by hardware, such as an application specific integrated circuit (ASIC), a programmable logic device (PLD), and a field programmable gate array (FPGA). The program may be recorded on a computer-readable recording medium. Examples of the computer-readable recording medium include portable media, such as a flexible disk, a magneto-optical disk, a ROM, and a CD-ROM, and a storage device such as a hard disk provided in a computer system. The program may be transmitted through a telecommunication line.

In addition, the correspondence relationship between the sitting situation data and the correct answer data corresponding to the sitting situation data is not necessarily the machine learning model. The correspondence relationship may be a mapping indicating the conversion of the sitting situation data into the correct answer data corresponding to the sitting situation data. In this case, the mapping indicating the conversion of the sitting situation data into the correct answer data corresponding to the sitting situation data may be, for example, a mapping obtained by optimizing a predetermined function including parameters using an optimization method such as quantum annealing or a gate-type quantum computer.

In addition, the correct answer data may be information that indicates a change from the start time to the end time of the low back pain determination period and a change in the probability of low back pain occurring in the person, who performs the movement of the center of gravity indicated by the sitting situation data, after the period end time.

(Other Points of View)

In other words, the device, the method, and the program according to one aspect of the invention can also be expressed as follows.

There is provided a low back pain occurrence estimation model acquisition device including a correspondence relationship acquisition unit that acquires a correspondence relationship between sitting situation data and correct answer data corresponding to the sitting situation data on the basis of the sitting situation data, which is information including the length of a sitting period that is a period for which a person is sitting on a chair and the number of times a gravity center movement common pattern indicating how the position of the center of gravity of the person sitting on the chair changes for a predetermined time appears for the sitting period, and the correct answer data which is information indicating a change from the start time to the end time of a low back pain determination period that is a predetermined period including the sitting period and a change in the probability of low back pain occurring in the person who performs the movement of the center of gravity indicated by the sitting situation data after the end time. In addition, there is provided a program that causes a computer to function as the low back pain occurrence estimation model acquisition device.

Further, there is provided a low back pain occurrence estimation method including a correspondence relationship acquisition step of acquiring a correspondence relationship between sitting situation data and correct answer data corresponding to the sitting situation data on the basis of the sitting situation data, which is information including the length of a sitting period that is a period for which a person is sitting on a chair and the number of times a gravity center movement common pattern indicating how the position of the center of gravity of the person sitting on the chair changes for a predetermined time appears for the sitting period, and the correct answer data which is information indicating a change from the start time to the end time of a low back pain determination period that is a predetermined period including the sitting period and a change in the probability of low back pain occurring in the person, who performs the movement of the center of gravity indicated by the sitting situation data, after the end time.

Furthermore, in the low back pain occurrence estimation model acquisition device, assuming that a time series indicating a change in the position of the center of gravity of the person for the sitting period over time is defined as gravity center movement information, at least some time series, which are among the time series indicated by the gravity center movement information and are time series of unit time are defined as unit time information, each classification that is the result of clustering for a set of the unit time information is defined as a unit classification, and how the unit classification appears in the gravity center movement information is defined as an appearance pattern, the gravity center movement common pattern is an appearance pattern that satisfies an appearance frequency condition which is a condition related to the magnitude of the frequency of appearance among the appearance patterns that appear in one or more gravity center movement information items.

Moreover, in the low back pain occurrence estimation model acquisition device, the appearance frequency condition is, for example, a condition from an appearance pattern having the highest appearance frequency to an appearance pattern having the N-th highest appearance frequency (N is a predetermined integer of 1 or greater).

In addition, in the low back pain occurrence estimation model acquisition device, the appearance pattern is a result estimated using a hidden Markov process.

Further, in the low back pain occurrence estimation model acquisition device, a machine learning model is obtained by a machine learning method on the basis of the sitting situation data and the correct answer data corresponding to the sitting situation data.

Furthermore, according to an aspect of the invention, there is provided a low back pain occurrence estimation device including an estimation unit that estimates the probability of low back pain occurring in a subject of analysis after an end time of a low back pain determination period, on the basis of sitting situation data related to the subject of analysis, for which the prediction of the occurrence of the low back pain is to be performed, using a correspondence relationship acquired by a low back pain occurrence estimation model acquisition device including a correspondence relationship acquisition unit that acquires the correspondence relationship between the sitting situation data and correct answer data corresponding to the sitting situation data on the basis of the sitting situation data, which is information including the length of a sitting period that is a period for which a person is sitting on a chair and the number of times a gravity center movement common pattern indicating how the position of the center of gravity of the person sitting on the chair changes for a predetermined time appears for the sitting period, and the correct answer data which is information indicating a change from the start time to the end time of the low back pain determination period that is a predetermined period including the sitting period and a change in the probability of the low back pain occurring in the person, who performs the movement of the center of gravity indicated by the sitting situation data, after the end time.

The embodiments of the invention have been described in detail above with reference to the drawings. However, the specific configuration is not limited to the embodiments and also includes designs and the like within the range that does not deviate from the scope and spirit of the invention.

While preferred embodiments of the invention have been described and illustrated above, it should be understood that these are slope of the invention and are not to be considered as limiting. Additions, omissions, substitutions, and other modifications can be made without departing from the scope of the invention. Accordingly, the invention is not to be considered as being limited by the above descriptions and is only limited by the scope of the appended claims.

EXPLANATION OF REFERENCES

100 Low back pain occurrence estimation system
1 Training data set generation device
2 Low back pain occurrence estimation model acquisition device
3 Low back pain occurrence estimation device
4 Sensor
5 Sitting situation data generation model acquisition device
6 Low back pain analysis device
11 Control unit
12 Communication unit
13 Input unit
14 Storage unit
15 Output unit
101 Communication control unit
102 Input control unit
103 Output control unit
104 Sitting situation data generation unit
105 Training data generation unit
106 Recording unit
21 Control unit
22 Communication unit
23 Input unit
24 Storage unit
25 Output unit
201 Communication control unit
202 Input control unit
203 Output control unit
204 Training data set acquisition unit
205 Correspondence relationship acquisition unit
206 Recording unit
251 Low back pain occurrence estimation learning model execution unit
252 Update unit
253 End determination unit
31 Control unit
32 Communication unit
33 Input unit
34 Storage unit
35 Output unit
301 Communication control unit
302 Input control unit
303 Output control unit
304 Analysis subject data acquisition unit
305 Analysis subject sitting situation data generation unit
306 Estimation unit
307 Recording unit
51 Control unit
52 Communication unit
53 Input unit
54 Storage unit
55 Output unit
501 Communication control unit
502 Input control unit
503 Output control unit
504 Sitting situation data generation model acquisition unit
505 Recording unit
61 Control unit
62 Communication unit
63 Input unit
64 Storage unit
65 Output unit
601 Communication control unit
602 Input control unit
603 Output control unit
604 Analysis unit
605 Recording unit
91 Processor 92 Memory
93 Processor
94 Memory
95 Processor
96 Memory
97 Processor
98 Memory
99 Processor
90 Memory

What is claimed is:

1. A low back pain analysis device comprising:
furniture including a sensor that acquires gravity center movement data during a period in which a person is sitting on the furniture:
a processor; and
a storage medium having computer program instructions stored thereon, wherein the computer program instructions, when executed by the processor, perform processing of:
receiving the gravity center movement data from the sensor;
processing the gravity center movement data from the sensor in real-time to obtain a unit classification of the gravity center movement data, including dividing the gravity center movement data for each unit of time during the period in which the person is sitting on the furniture;
performing clustering on the unit classification of the gravity center movement data;
identifying a movement pattern, including based on both a stable sitting state and a body movement based on the clustering on the unit classification of the gravity center movement data; and
determining a relationship between the pattern and a low back pain.

2. The low back pain analysis device according to claim 1, wherein the computer program instructions further perform processing of:
estimating a probability of the low back pain occurring in a person, who is a subject of analysis, using a frequency of appearance of the pattern; and
acquiring the frequency of appearance of the pattern based on the gravity center movement data of the person who is the subject of analysis.

3. The low back pain analysis device according to claim 2,
wherein the frequency of appearance is a condition from an appearance pattern having a highest frequency of appearance to an appearance pattern having an N-th highest frequency of appearance (N is a predetermined integer of 1 or greater).

4. The low back pain analysis device according to claim 2, wherein the computer program instructions further perform processing of:
analyzing the pattern using a hidden Markov process to estimate an appearance pattern from fluctuating time series.

5. The low back pain analysis device according to claim 2, wherein the computer program instructions further perform processing of:
estimating the probability of the low back pain occurring in the person, who is the subject of analysis, wherein the estimating is performed using a machine learning model using the gravity center movement data.

6. The low back pain analysis device according to claim 1, wherein determining the relationship between the pattern and low back pain includes correlating a frequency of alternating appearance of the stable sitting state and body movement classifications with a probability of low back pain occurrence.

7. The low back pain analysis device according to claim 1, further comprising, based on the determined relationship, providing a warning to a user.

8. The low back pain analysis device according to claim 1, further comprising, based on the determined relationship, providing a predetermined exercise to a user.

9. A low back pain analysis method, the method comprising:
acquiring gravity center movement data with a sensor included in furniture during a period in which a person is sitting on the furniture;
using a processor performing computer program instructions for:
receiving the gravity sensor movement data;
processing the gravity center movement data in real-time to obtain a unit classification of the gravity center movement data, including dividing the gravity center movement data for each unit of time during the period in which the person is sitting on the furniture;
performing clustering on the unit classification of the gravity center movement data;
identifying a movement pattern, including based on both a stable sitting state and a body movement based on the clustering on the unit classification of the gravity center movement data; and
determining a relationship between the pattern and a low back pain.

10. The low back pain analysis method according to claim 9, further comprising, using the processor for:
estimating a probability of the low back pain occurring in a person, who is a subject of analysis, using a frequency of appearance of the pattern, and
acquiring the frequency of appearance of the pattern based on the gravity center movement data of the person who is the subject of analysis.

* * * * *